US012563164B2

(12) United States Patent
    Kubota

(10) Patent No.: US 12,563,164 B2
(45) Date of Patent: Feb. 24, 2026

(54) PROJECTION METHOD AND NON-TRANSITORY COMPUTER-READABLE STORAGE MEDIUM STORING PROGRAM

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 126 days.

(21) Appl. No.: 18/411,098

(22) Filed: Jan. 12, 2024

(65) Prior Publication Data

US 2024/0244169 A1    Jul. 18, 2024

(30) Foreign Application Priority Data

Jan. 13, 2023    (JP) ................................. 2023-003458

(51) Int. Cl.
    *H04N 9/31*        (2006.01)
(52) U.S. Cl.
    CPC ......... *H04N 9/3185* (2013.01); *H04N 9/3194* (2013.01)
(58) Field of Classification Search
    CPC .. H04N 9/3185; H04N 9/3188; H04N 9/3194; H04N 9/3141; G03B 21/147
    See application file for complete search history.

(56) References Cited

U.S. PATENT DOCUMENTS

| | | | | | |
|---|---|---|---|---|---|
| 10,134,118 | B2 * | 11/2018 | Wada | ........................ | G06T 7/80 |
| 2004/0061838 | A1 * | 4/2004 | Mochizuki | ............... | H04N 5/74 |
| | | | | | 353/69 |

(Continued)

FOREIGN PATENT DOCUMENTS

| | | |
|---|---|---|
| JP | 2011-033930 A | 2/2011 |
| JP | 2013-041167 A | 2/2013 |

(Continued)

*Primary Examiner* — John W Miller
*Assistant Examiner* — Humam M Satti
(74) *Attorney, Agent, or Firm* — Dority & Manning, P.A.

(57) ABSTRACT

A projection method includes: displaying, by controlling a projection apparatus, a projection image having four corners inside a display area having four corners, the display area being an area on a projection surface; acquiring a first captured image that is a captured image of a range including the display area where the projection image is displayed; detecting, by performing image processing on the first captured image, a plurality of first feature points corresponding one-to-one to each of four corners of a first image indicating the display area in the first captured image; displaying, by controlling the projection apparatus, a pointer image for adjusting a shape of the projection image, the pointer image being located at a corner of the projection image; performing a first correction of correcting the shape of the projection image by changing a position of the corner of the projection image based on a user operation for moving the pointer image; and performing, based on the plurality of first feature points, a second correction for maintaining a positional relationship between the four corners of the display area and the four corners of the projection image determined by the first correction.

10 Claims, 13 Drawing Sheets

(56)           References Cited

U.S. PATENT DOCUMENTS

| 2005/0231691 A1* | 10/2005 | Li | ........................ H04N 9/3194 |
| | | | 353/69 |
| 2011/0032492 A1 | 2/2011 | Nara | |
| 2012/0007986 A1 | 1/2012 | Tsuida | |
| 2013/0335451 A1 | 12/2013 | Tsuji | |
| 2014/0168376 A1 | 6/2014 | Hasegawa et al. | |
| 2014/0267427 A1 | 9/2014 | Hasegawa | |
| 2018/0359466 A1 | 12/2018 | Sugiura | |
| 2018/0376117 A1* | 12/2018 | Chen | .................... H04N 9/3194 |
| 2022/0191392 A1 | 6/2022 | Kurota | |
| 2025/0142034 A1* | 5/2025 | Chung | .................... G10L 15/26 |

FOREIGN PATENT DOCUMENTS

| JP | 2014-027651 A | 2/2014 |
| JP | 2014-179698 A | 9/2014 |
| JP | 2015-142157 A | 8/2015 |
| JP | 2018-207373 A | 12/2018 |
| JP | 2022-092132 A | 6/2022 |
| JP | 2022-092169 A | 6/2022 |
| WO | WO2010/116836 A | 10/2010 |

* cited by examiner

Figure 16:
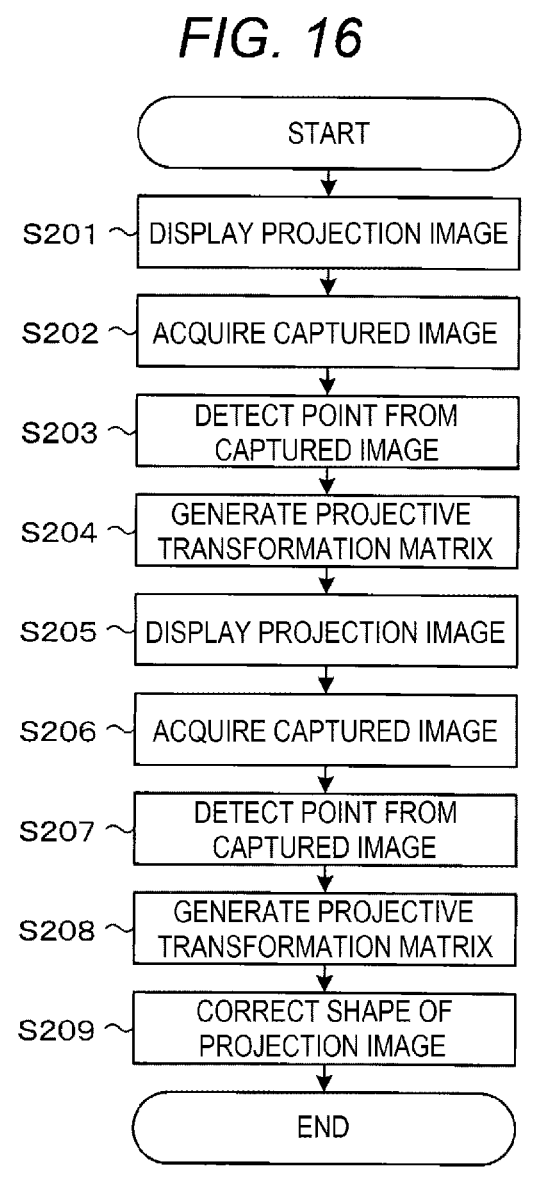

```
                    ┌──────────────────┐
                    │      START       │
                    └──────────────────┘
                             │
                             ▼
S201 ~  ┌──────────────────────────────────┐
        │   DISPLAY PROJECTION IMAGE        │
        └──────────────────────────────────┘
                             │
                             ▼
S202 ~  ┌──────────────────────────────────┐
        │     ACQUIRE CAPTURED IMAGE        │
        └──────────────────────────────────┘
                             │
                             ▼
S203 ~  ┌──────────────────────────────────┐
        │       DETECT POINT FROM           │
        │        CAPTURED IMAGE             │
        └──────────────────────────────────┘
                             │
                             ▼
S204 ~  ┌──────────────────────────────────┐
        │     GENERATE PROJECTIVE           │
        │   TRANSFORMATION MATRIX           │
        └──────────────────────────────────┘
                             │
                             ▼
S205 ~  ┌──────────────────────────────────┐
        │   DISPLAY PROJECTION IMAGE        │
        └──────────────────────────────────┘
                             │
                             ▼
S206 ~  ┌──────────────────────────────────┐
        │     ACQUIRE CAPTURED IMAGE        │
        └──────────────────────────────────┘
                             │
                             ▼
S207 ~  ┌──────────────────────────────────┐
        │       DETECT POINT FROM           │
        │        CAPTURED IMAGE             │
        └──────────────────────────────────┘
                             │
                             ▼
S208 ~  ┌──────────────────────────────────┐
        │     GENERATE PROJECTIVE           │
        │   TRANSFORMATION MATRIX           │
        └──────────────────────────────────┘
                             │
                             ▼
S209 ~  ┌──────────────────────────────────┐
        │      CORRECT SHAPE OF             │
        │     PROJECTION IMAGE              │
        └──────────────────────────────────┘
                             │
                             ▼
                    ┌──────────────────┐
                    │       END        │
                    └──────────────────┘
```

PROJECTION METHOD AND NON-TRANSITORY COMPUTER-READABLE STORAGE MEDIUM STORING PROGRAM

The present application is based on, and claims priority from JP Application Serial Number 2023-003458, filed Jan. 13, 2023, the disclosure of which is hereby incorporated by reference herein in its entirety.

BACKGROUND

1. Technical Field

The present disclosure relates to a projection method and a non-transitory computer-readable storage medium storing a program.

2. Related Art

There has been developed a technique for correcting a position of an image displayed on a projection surface by an apparatus such as a projector and a shape of the image. For example, JP-A-2022-092169 discloses a projector that corrects an image displayed on a projection surface when a position of the projector deviates from an initial position and thus displays the image at the same position as a position where the image is displayed in a period when the projector is located at the initial position.

JP-A-2022-092169 is an example of the related art.

SUMMARY

When a shape of the image displayed on the projection surface is not a shape desired by a user in a period as a correction reference during which the projector described in JP-A-2022-092169 is located at the initial position, the shape is maintained. Therefore, it is necessary to adjust the shape of the image displayed on the projection surface to the shape desired by the user in advance in the period serving as the correction reference. In the adjustment, it is necessary for the user to accurately set a position, an orientation, an angle, and the like of the projector, which is time-consuming for the user.

An aspect of a projection method according to the disclosure includes: displaying, by controlling a projection apparatus, a projection image having four corners inside a display area having four corners, the display area being an area on a projection surface; acquiring a first captured image that is a captured image of a range including the display area where the projection image is displayed; detecting, by performing image processing on the first captured image, a plurality of first feature points corresponding one-to-one to each of four corners of a first image indicating the display area in the first captured image; displaying, by controlling the projection apparatus, a pointer image for adjusting a shape of the projection image, the pointer image being located at a corner of the projection image; performing a first correction of correcting the shape of the projection image by changing a position of the corner of the projection image based on a user operation for moving the pointer image; and performing, based on the plurality of first feature points, a second correction for maintaining a positional relationship between the four corners of the display area and the four corners of the projection image determined by the first correction.

An aspect of a program according to the disclosure includes causing a processing apparatus to control a projection apparatus to display a projection image having four corners inside a display area having four corners, the display area being an area on a projection surface, acquire a first captured image representing a result of imaging a range including the display area where the projection image is displayed, detect, by performing image processing on the first captured image, a plurality of first feature points corresponding one-to-one to each of four corners of a first image indicating the display area in the first captured image, control the projection apparatus to display a pointer image for adjusting a shape of the projection image, the pointer image being located at a corner of the projection image, perform a first correction of correcting the shape of the projection image by changing a position of the corner of the projection image based on a user operation for moving the pointer image, and perform, based on the plurality of first feature points, a second correction for maintaining a positional relationship between the four corners of the display area and the four corners of the projection image determined by the first correction.

BRIEF DESCRIPTION OF THE DRAWINGS

FIG. 2 is a schematic diagram showing a state in which a projection image GP2 is displayed in a second period.

FIG. 3 is a schematic diagram showing a state in which the projection image GP2 is displayed in a third period.

FIG. 16 is a flowchart showing an operation of the projector 1 in a time period including the fourth period to the sixth period.

DESCRIPTION OF EMBODIMENTS

Figure 1:
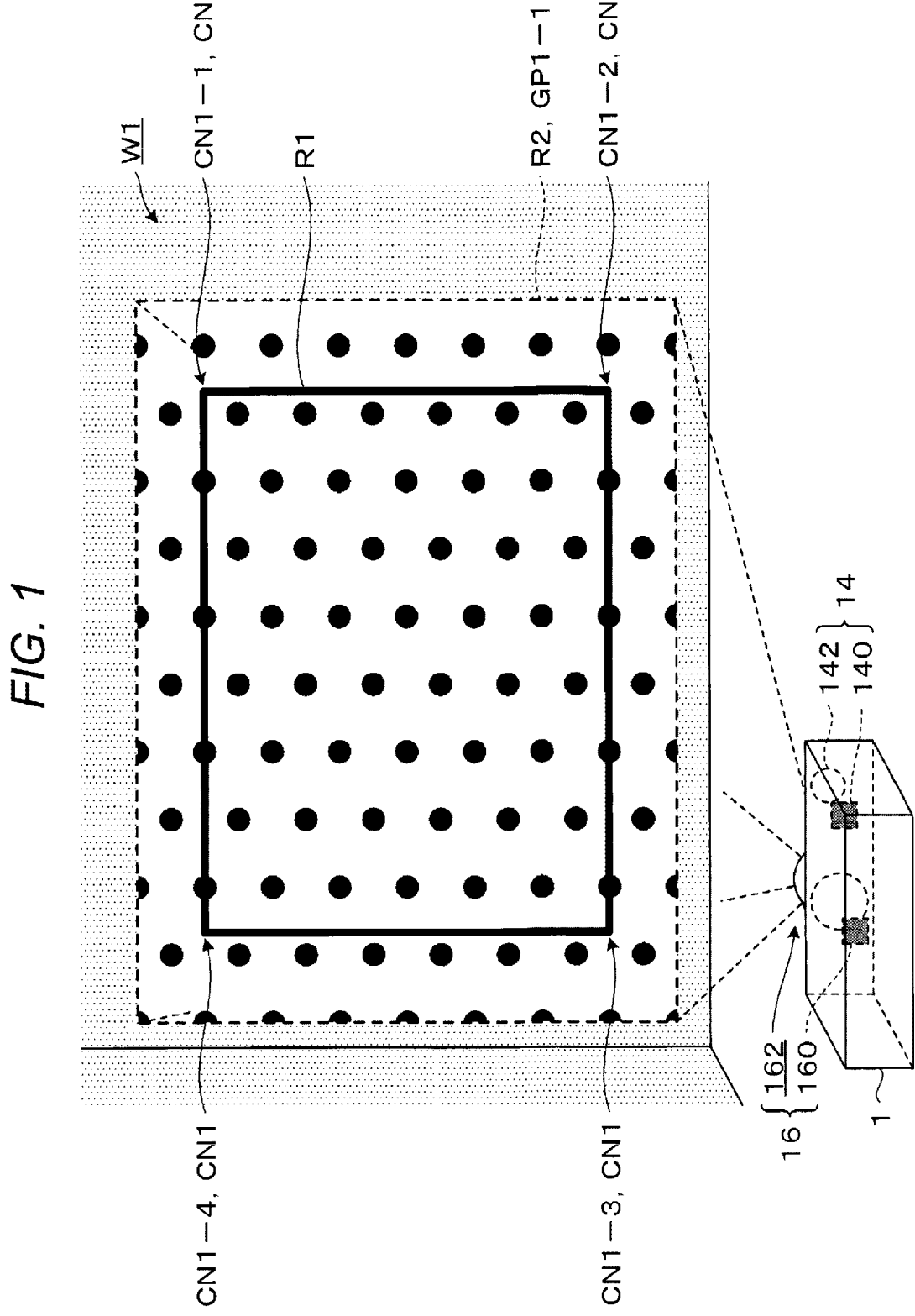
FIG. 1 is a schematic diagram showing a state in which a projection image GP1 is displayed in a first period.

Hereinafter, preferred embodiments according to the disclosure will be described with reference to the accompanying drawings. In the drawings, dimensions and scale of each part may be different from actual dimensions and scale, and some parts are schematically shown for easy understanding.

In addition, the scope of the disclosure is not limited to the following embodiments unless otherwise specified in the following description.

1. FIRST EMBODIMENT

In a first embodiment, a projection method and a program according to the disclosure will be described by showing a projector as an example, which corrects a shape of an image displayed on a projection surface based on an operation from a user and displays the corrected image at a predetermined position on the projection surface. That is, the user can easily adjust the shape of the image displayed on the projection surface without accurately setting an orientation and an angle of the projector according to the present embodiment.

1.1. Outline of Projector

Hereinafter, an outline of a projector 1 according to the first embodiment will be described with reference to FIGS. 1 to 6.

FIG. 1 is a schematic diagram showing a state in which a projection image GP1 is displayed in a first period. The projector 1 displays the projection image GP1 by projecting projection light onto an area R2 on a wall surface W1 that is a projection surface. The projection image GP1 includes a plurality of points. The projection image GP1 in the first period may be referred to as a "projection image GP1-1".

The projector 1 includes an imaging apparatus 14 that images a range including a predetermined area on the projection surface, and a projection apparatus 16 that projects projection light onto the projection surface. The imaging apparatus 14 includes an imaging lens 142 for collecting light, and an imaging element 140 that generates a captured image by converting the light collected by the imaging lens 142 into an electric signal. The imaging element 140 includes a plurality of pixels. The projection apparatus 16 includes a light source (not shown), an optical modulator 160 that modulates light emitted from the light source into the projection light for displaying the projection image on the projection surface, and a projection lens 162 that projects the projection light modulated by the optical modulator 160 onto the projection surface. The optical modulator 160 includes a plurality of pixels. The projector 1 controls the projection apparatus 16 to display the projection image on the projection surface. In the present embodiment, the projector 1 controls the projection apparatus 16 to display the projection image on the wall surface W1.

In the first period, the projector 1 controls the imaging apparatus 14 to image a range including the area R2 where the projection image GP1-1 is displayed. The area R2 includes an area R1. That is, the projector 1 images a range including the area R1. The area R1 has a plurality of corners CN1. The plurality of corners CN1 include a corner CN1-1, a corner CN1-2, a corner CN1-3, and a corner CN1-4. The area R1 may be, for example, an area located on a screen provided on the wall surface W1 and surrounded by a frame of the screen, or an area on the wall surface W1 surrounded by a frame line drawn on a part of a surface of the wall surface W1. The projector 1 generates information indicating a correspondence relationship between the plurality of pixels of the optical modulator 160 and the plurality of pixels of the imaging element 140 based on a captured image representing a result of imaging the range including the area R2 where the projection image GP1-1 is displayed and the image projected from the projector 1 when the projection image GP1-1 is displayed.

A position of the area R1, specifically, positions of four corners of the area R1 are explicitly shown on the wall surface W1. In FIG. 1, the position of the area R1 is shown by a thick straight line, but is not limited thereto. For example, the position of the area R1 may be indicated by attaching a marker indicating a position of the corner of the area R1 to each of the four corners of the area R1. In FIG. 1, the thick straight line indicating the position of the area R1 corresponds to the frame of the screen or the frame line drawn on a part of the surface of the wall surface W1.

Figure 2:
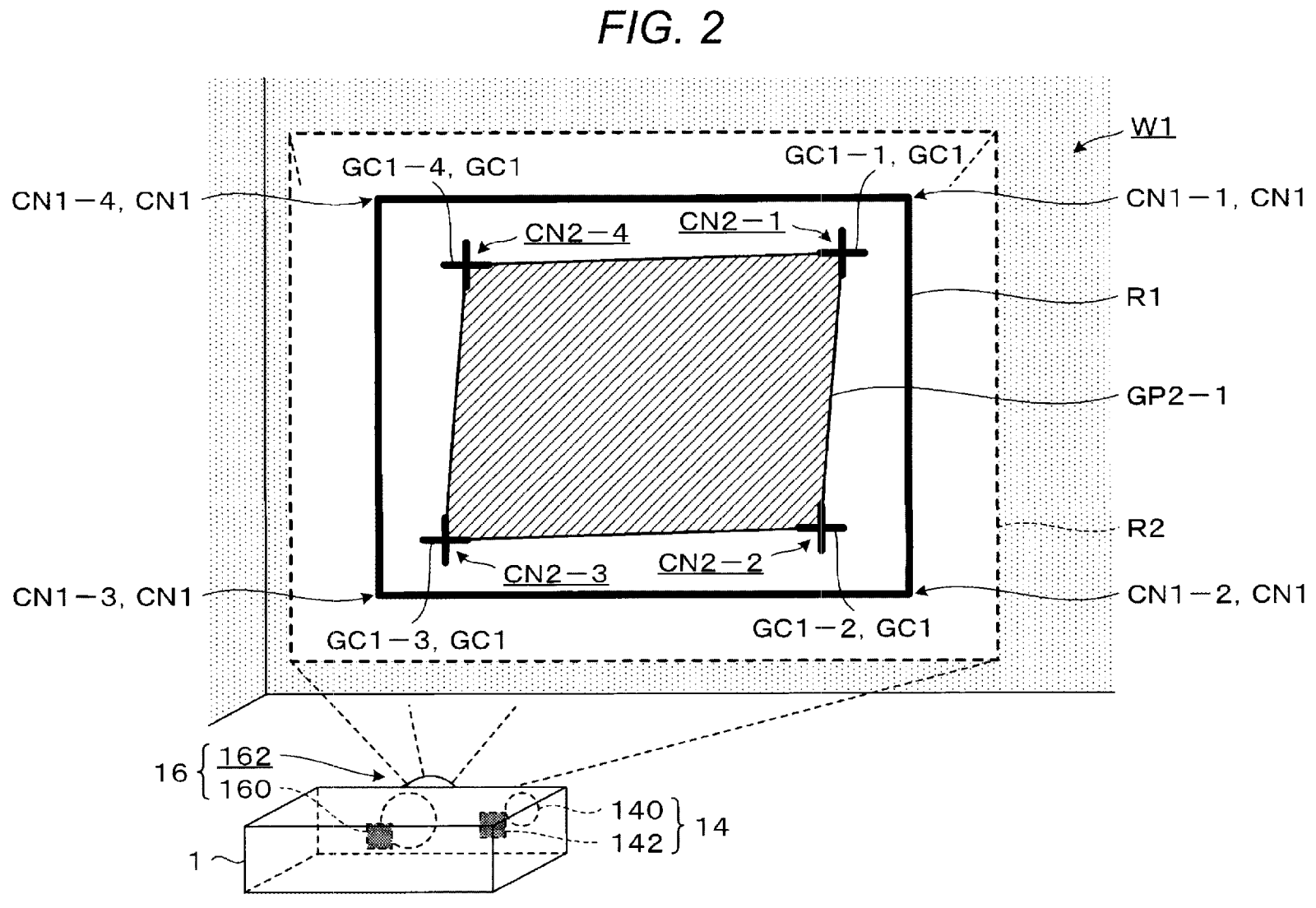

FIG. 2 is a schematic diagram showing a state in which a projection image GP2 is displayed in a second period. The second period is a period after the first period. The projector 1 controls the projection apparatus 16 to display the projection image GP2 in the area R1 on the wall surface W1. The projection image GP2 has a corner CN2-1, a corner CN2-2, a corner CN2-3, and a corner CN2-4. The projection image GP2 in the second period may be referred to as a "projection image GP2-1".

The projector 1 controls the projection apparatus 16 to display a pointer image GC1-1 indicating a position of the corner CN2-1, a pointer image GC1-2 indicating a position of the corner CN2-2, a pointer image GC1-3 indicating a position of the corner CN2-3, and a pointer image GC1-4 indicating a position of the corner CN2-4. The pointer images GC1-1 to GC1-4 each have, for example, a cross shape in which two straight lines intersect each other. When the pointer images GC1-1 to GC1-4 are not distinguished, the pointer images GC1-1 to GC1-4 may each be referred to as a "pointer image GC1".

By performing an operation of moving the pointer image GC1, the user changes the position of the corner of the projection image GP2 indicated by the pointer image GC1. For example, the user changes the position of the corner CN2-1 indicated by the pointer image GC1-1 by performing an operation of moving the pointer image GC1-1. The projector 1 corrects a shape of the projection image GP2 by changing the position of the corner of the projection image GP2 based on the operation from the user for moving the pointer image GC1. The user corrects the shape of the projection image GP2 into a desired shape by changing the position of the corner of the projection image GP2. For example, the shape of the projection image GP2 is corrected by the user to be substantially similar to the screen frame. That is, when the screen frame is rectangular, the shape of the projection image GP2 is adjusted based on the operation from the user such that the shape of the projection image GP2 is also rectangular. The correction of the shape of the projection image based on the operation from the user may be referred to as a "first correction".

Figure 3:
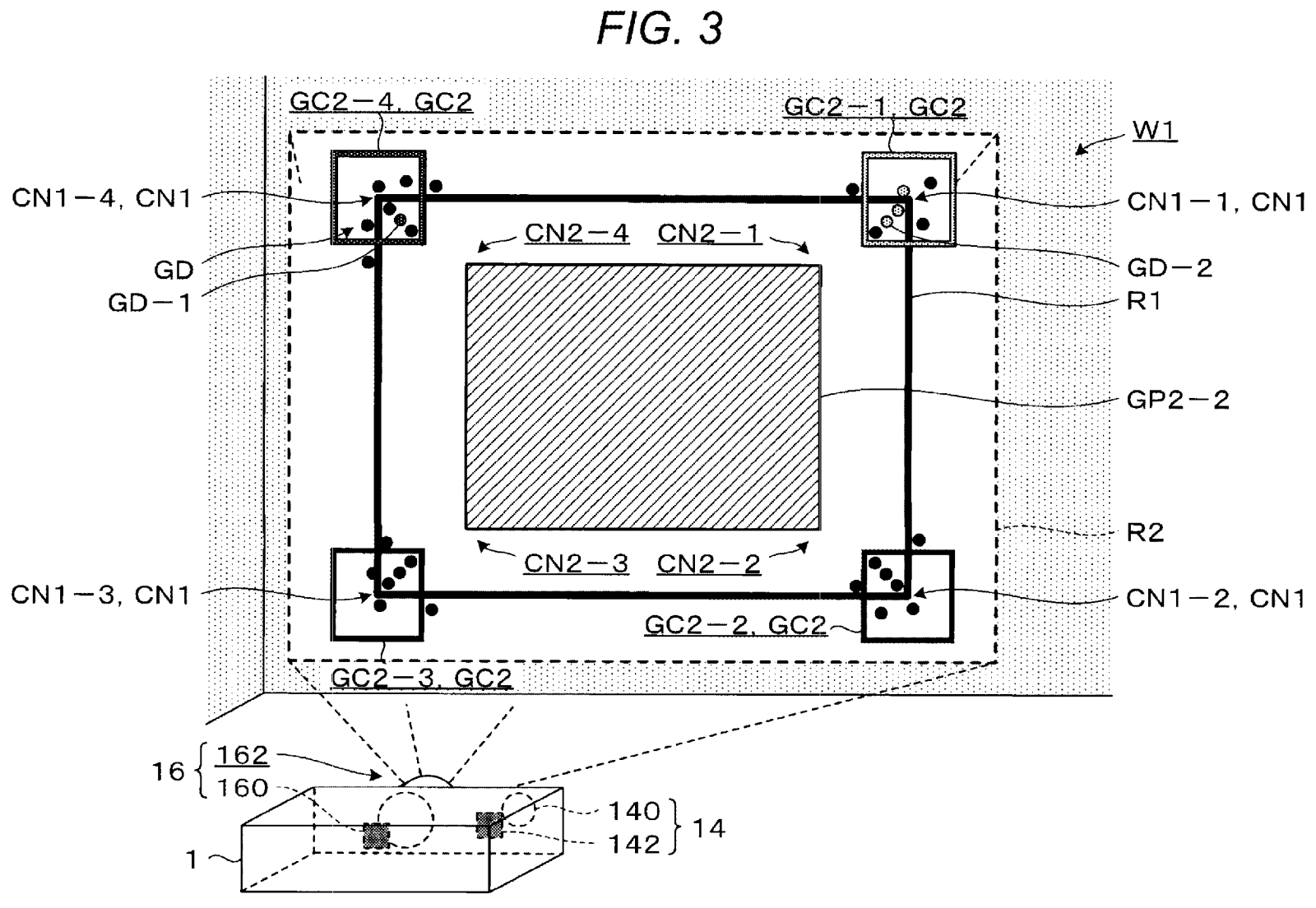

FIG. 3 is a schematic diagram showing a state in which the projection image GP2 is displayed in a third period. The third period is a period after the second period. The projection image GP2 in the third period may be referred to as a "projection image GP2-2". The projection image GP2-2 is the projection image GP2 on which the first correction is performed. The projection image GP2-2 is displayed in the area R1.

In the third period, the projector 1 controls the imaging apparatus 14 to image a range including the area R1 where the projection image GP2-2 is displayed. The projector 1 performs image processing on a captured image representing a result of imaging the range including the area R1 where the projection image GP2-2 is displayed, and thus detects a plurality of points corresponding to four corners of an image indicating the area R1 in the captured image. In order to detect the plurality of points, it is preferable that the range including the area R1 is imaged in a state in which the projection light reaches not only inside of the area R1 but also the thick straight line (for example, the screen frame) indicating the area R1. Accordingly, brightness of the thick straight line, such as the screen frame, is increased, and a plurality of points related to the screen frame are easily detected.

The projector 1 controls the projection apparatus 16 to display, on the wall surface W1, a corner image GC2-1 indicating a position of the corner CN1-1, a corner image GC2-2 indicating a position of the corner CN1-2, a corner image GC2-3 indicating a position of the corner CN1-3, and a corner image GC2-4 indicating a position of the corner CN1-4. When the corner images GC2-1 to GC2-4 are not distinguished, the corner images GC2-1 to GC2-4 may each be referred to as a "corner image GC2".

The projector 1 controls the projection apparatus 16 to display, on the wall surface W1, a plurality of instruction images GD corresponding one-to-one to the plurality of points detected from the captured image representing the result of imaging the range including the area R1 where the projection image GP2-2 is displayed. The plurality of instruction images GD are images for indicating, to the user, a relative positional relationship between the plurality of points detected from the captured image and the image indicating the area R1 in the captured image. The plurality of instruction images GD include one or more instruction images GD corresponding to the corner CN1-1, one or more instruction images GD corresponding to the corner CN1-2, one or more instruction images GD corresponding to the corner CN1-3, and one or more instruction images GD corresponding to the corner CN1-4. The one or more instruction images GD corresponding to the corner CN1-1 include an instruction image GD-2. The one or more instruction images GD corresponding to the corner CN1-4 include an instruction image GD-1. A display mode of the instruction image GD is different from a display mode of the pointer image GC1.

The user performs an operation of selecting one corner image GC2 from the corner images GC2-1 to GC2-4. In other words, the user performs an operation of selecting the corner of the area R1 indicated by one corner image GC2 among the corner images GC2-1 to GC2-4. The projector 1 selects one corner image GC2 among the corner images GC2-1 to GC2-4 based on the operation from the user. For example, the user performs an operation of selecting the corner image GC2-4 from the corner images GC2-1 to GC2-4. In other words, the user performs an operation of selecting the corner CN1-4 indicated by the corner image GC2-4 among the corner images GC2-1 to GC2-4. The projector 1 selects the corner image GC2-4 among the corner images GC2-1 to GC2-4 based on the operation from the user. The projector 1 may change a display mode of the one corner image GC2 selected by the user. For example, when the corner image GC2-4 is selected by the user, the projector 1 may control the projection apparatus 16 to make a display mode of the corner image GC2-4 different from display modes of the other corner images GC2-1 to GC2-3. Accordingly, the user can easily check the currently selected corner image GC2.

When one corner image GC2 is selected from the corner images GC2-1 to GC2-4, the user performs an operation of determining one instruction image GD serving as a selection candidate from the one or more instruction images GD corresponding to the corner of the area R1 indicated by the one corner image GC2. The projector 1 determines one instruction image GD serving as the selection candidate based on the operation from the user. The projector 1 controls the projection apparatus 16 to display the one instruction image GD in a manner distinguishable from the other instruction images GD. For example, when the corner image GC2-4 is selected from the corner images GC2-1 to GC2-4 whereas the instruction image GD-1 is determined as one instruction image GD serving as the selection candidate from the one or more instruction images GD corresponding to the corner CN1-4 indicated by the corner image GC2-4, the projector 1 controls the projection apparatus 16 to display the instruction image GD-1 in a manner distinguishable from the other instruction images GD. Specifically, the projector 1 controls the projection apparatus 16 to change a display mode of the instruction image GD-1 over time. More specifically, the projector 1 repeatedly blinks the instruction image GD-1 to display the instruction image GD-1 in a manner distinguishable from the other instruction images GD.

When one instruction image GD among the plurality of instruction images GD is displayed in a manner distinguishable from the other instruction images GD, the user performs an operation of selecting the one instruction image GD. The projector 1 selects, based on the operation from the user, a point corresponding to the one instruction image GD, which is a point detected from the captured image representing the result of imaging the range including the area R1 where the projection image GP2-2 is displayed. The projector 1 controls the projection apparatus 16 to change the display mode of the one instruction image GD. For example, when the instruction image GD-2 among the plurality of instruction images GD is displayed in a manner distinguishable from the other instruction images GD, the user performs an operation of selecting the instruction image GD-2. The projector 1 selects a point corresponding to the instruction image GD-2, which is a point detected from the captured image representing the result of imaging the range including the area R1 where the projection image GP2-2 is displayed. The projector 1 controls the projection apparatus 16 to change a display mode of the instruction image GD-2. Specifically, the projector 1 controls the projection apparatus 16 to change a color of the instruction image GD-2. Accordingly, the user can easily check selection of the point corresponding to the instruction image GD whose display mode is changed.

When the point corresponding to the one instruction image GD displayed in a manner distinguishable from the other instruction images GD is selected based on an operation from the user for selecting the one instruction image GD, the user may perform an operation of determining another instruction image GD different from the one instruction image GD as the selection candidate. The projector 1 determines the different instruction image GD as the selection candidate based on the operation from the user. That is, the projector 1 controls the projection apparatus 16 to display the different instruction image GD in a manner distinguishable from the other instruction images GD. The user may perform an operation of selecting the different instruction image GD displayed in a manner distinguishable from the other instruction images GD. The projector 1 selects a point corresponding to the different instruction image GD, which is a point detected from the captured image representing the result of imaging the range including the area R1 where the projection image GP2-2 is displayed. The projector 1 controls the projection apparatus 16 to change a display mode of the different instruction image GD. That is, the user selects one or more instruction images GD from the one or more instruction images GD corresponding to the corner of the area R1 indicated by the one corner image GC2 selected from the corner images GC2-1 to GC2-4. The projector 1 selects one or more points corresponding one-to-one to the one or more instruction images GD selected by the user, which are one or more points detected from the captured image representing the result of imaging the range including the area R1 where the projection image GP2-2 is displayed.

When the selection of the one or more points from the one or more points corresponding one-to-one to the one or more instruction images GD corresponding to the corner of the area R1 indicated by the one corner image GC2 selected from the corner images GC2-1 to GC2-4 is completed, the projector 1 controls the projection apparatus 16 to change the display mode of the one corner image GC2. For example, in a case where the corner image GC2-1 is selected from the corner images GC2-1 to GC2-4, when selection of one or more points from one or more points corresponding one-to-one to the one or more instruction images GD corresponding to the corner CN1-1 indicated by the corner image GC2-1 is completed, the projector 1 controls the projection apparatus 16 to change the display mode of the corner image GC2-1. Specifically, the projector 1 controls the projection apparatus 16 to change a color of the corner image GC2-1. Accordingly, the user can easily check the selection of the one or more points from the one or more points corresponding one-to-one to the one or more instruction images GD corresponding to the corner of the area R1 indicated by the corner image GC2 whose display mode is changed.

The user selects one or more instruction images GD at each of the four corners of the area R1. That is, the user selects one or more instruction images GD from the one or more instruction images GD corresponding to the corner CN1-1 indicated by the corner image GC2-1. The user selects one or more instruction images GD from the one or more instruction images GD corresponding to the corner CN1-2 indicated by the corner image GC2-2. The user selects one or more instruction images GD from the one or more instruction images GD corresponding to the corner CN1-3 indicated by the corner image GC2-3. The user selects one or more instruction images GD from the one or more instruction images GD corresponding to the corner CN1-4 indicated by the corner image GC2-4. Accordingly, the projector 1 selects four or more points corresponding one-to-one to four or more instruction images GD selected by the user, which are four or more points detected from the captured image representing the result of imaging the range including the area R1 where the projection image GP2-2 is displayed.

Figure 4:
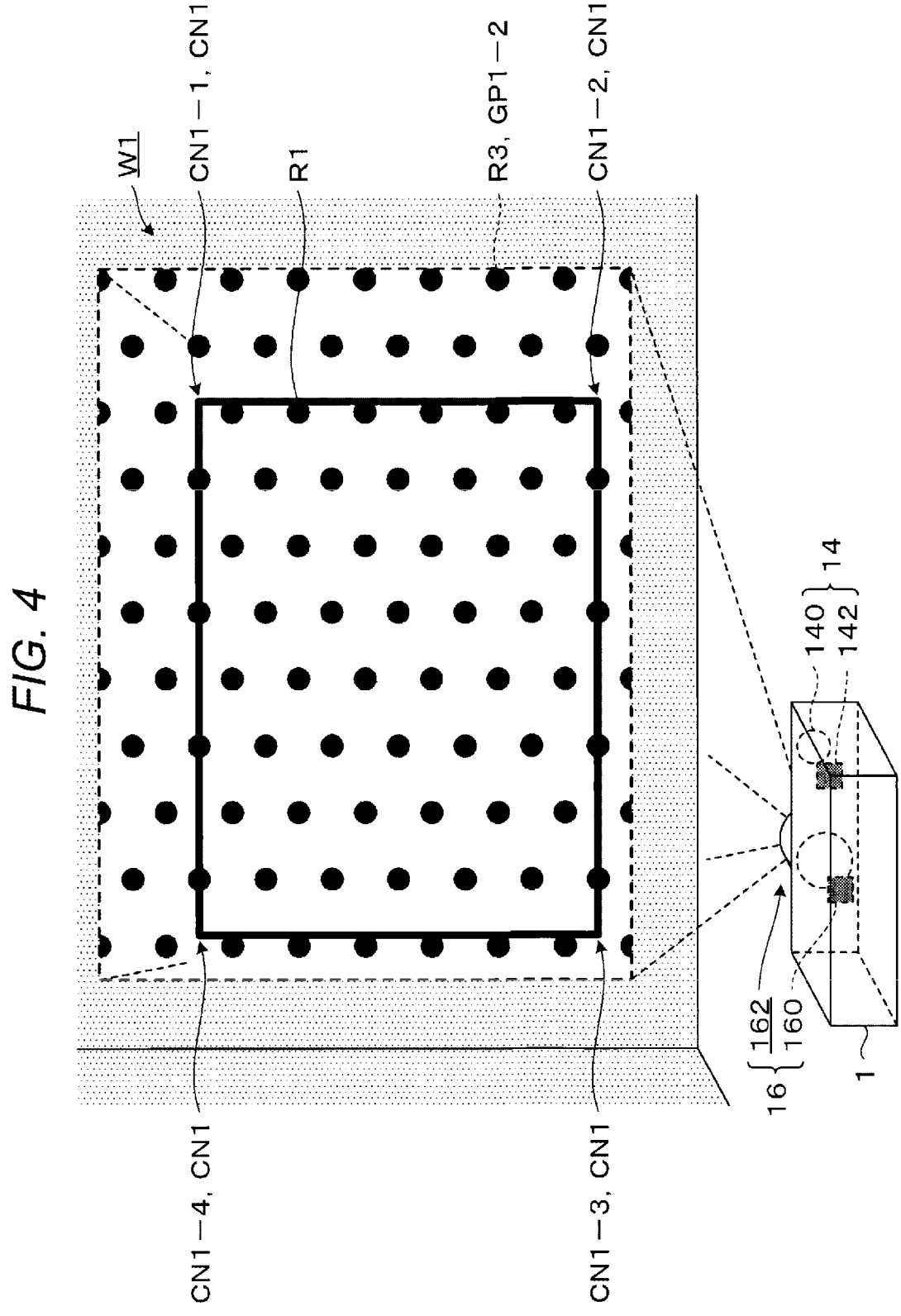
FIG. 4 is a schematic diagram showing a state in which the projection image GP1 is displayed in a fourth period.

FIG. 4 is a schematic diagram showing a state in which the projection image GP1 is displayed in a fourth period. The fourth period is a period after the third period. Specifically, the fourth period is a period after the user selects one or more instruction images GD at each of the four corners of the area R1.

In the fourth period, it is assumed that a position, an orientation, an angle, and the like of the projector 1 are different from a position, an orientation, an angle, and the like of the projector 1 in each of the first period, the second period, and the third period. Such a change in the position, the orientation, the angle, and the like of the projector 1 may be caused by, for example, unintended contact of the user with the projector 1. That is, the projector 1 displays the projection image GP1 by projecting the projection light onto an area R3 different from the area R2 on the wall surface W1 onto which the projection light is projected in the first period, the second period, and the third period. The area R3 includes the area R1. The projection image GP1 in the fourth period may be referred to as a "projection image GP1-2".

In the fourth period, the projector 1 controls the imaging apparatus 14 to image a range including the area R3 where the projection image GP1-2 is displayed. That is, the projector 1 images a range including the area R1. The projector 1 generates the information indicating the correspondence relationship between the plurality of pixels of the optical modulator 160 and the plurality of pixels of the imaging element 140 based on a captured image representing a result of imaging the range including the area R3 where the projection image GP1-2 is displayed and the image projected from the projector 1 when the projection image GP1-2 is displayed.

Figure 5:
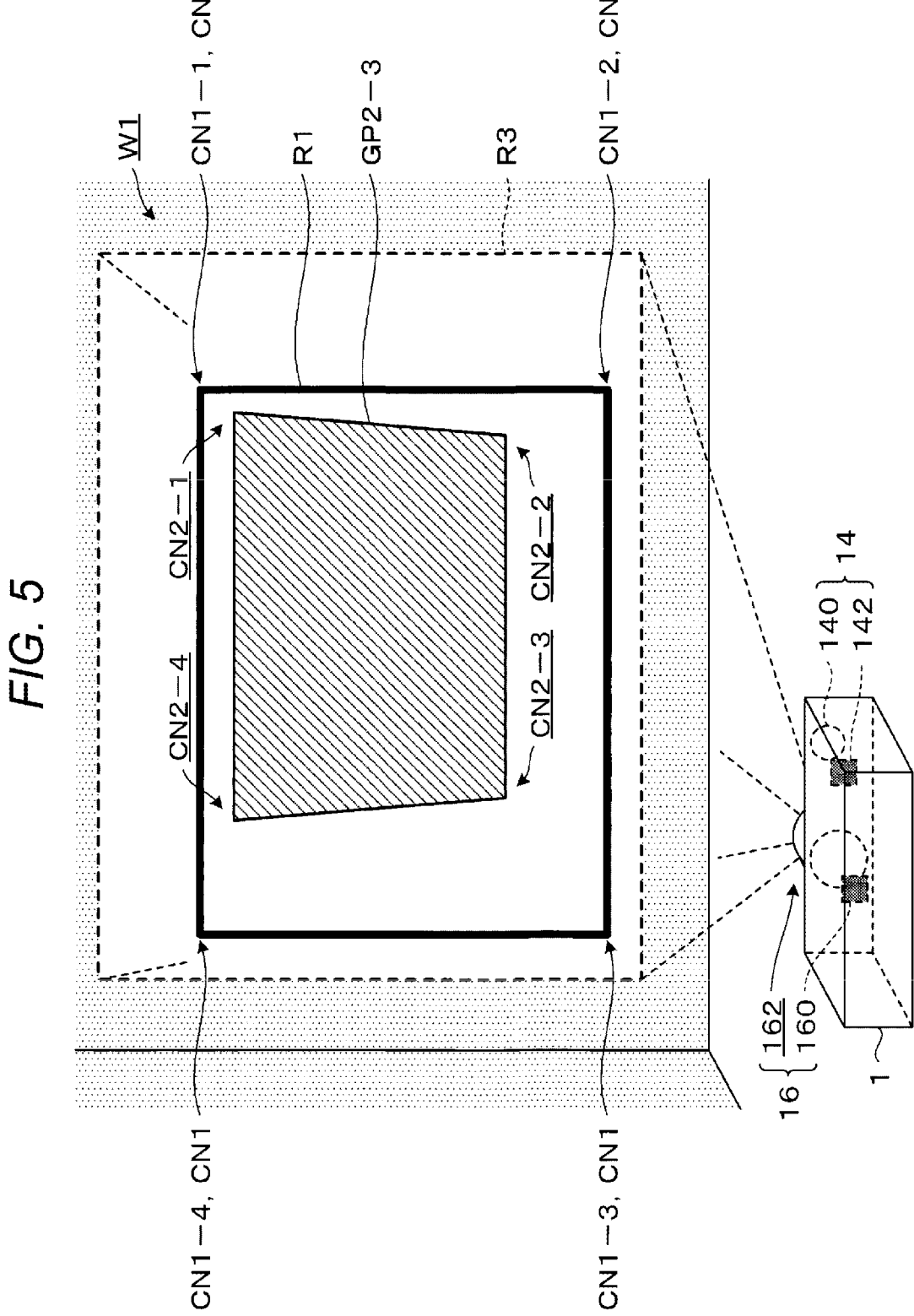
FIG. 5 is a schematic diagram showing a state in which the projection image GP2 is displayed in a fifth period.

FIG. 5 is a schematic diagram showing a state in which the projection image GP2 is displayed in a fifth period. The fifth period is a period after the fourth period. The projector 1 controls the projection apparatus 16 to display the projection image GP2 on the wall surface W1. Along with the change in the position, the orientation, the angle, and the like of the projector 1, a position where the projection image GP2 is displayed in the fifth period is different from a position where the projection image GP2 is displayed in the third period. A shape of the projection image GP2 in the fifth period is different from the shape of the projection image GP2 in the third period. The projection image GP2 in the fifth period may be referred to as a "projection image GP2-3". That is, a position where the projection image GP2-3 is displayed is different from a position where the projection image GP2-2 is displayed. A shape of the projection image GP2-3 is different from a shape of the projection image GP2-2. The projection image GP2-3 is displayed in the area R1. That is, the projection image GP2-3 is a projection image whose position and shape are deviated from the projection image GP2-2 desired by the user.

In the fifth period, the projector 1 controls the imaging apparatus 14 to image a range including the area R1 where the projection image GP2-3 is displayed. The projector 1 performs image processing on a captured image representing a result of imaging the range including the area R1 where the projection image GP2-3 is displayed, and thus detects a plurality of points corresponding to four corners of an image indicating the area R1 in the captured image.

The projector 1 generates a projective transformation matrix for correcting the position where the projection image GP2 is displayed and the shape of the projection image GP2 based on the information indicating the correspondence relationship between the plurality of pixels of the optical modulator 160 and the plurality of pixels of the imaging element 140, which is generated based on the captured image acquired in the first period, coordinates of the four or more points selected based on the operation from the user among the plurality of points detected from the captured image acquired in the third period, the information indicating the correspondence relationship between the plurality of pixels of the optical modulator 160 and the plurality of pixels of the imaging element 140, which is generated based on the captured image acquired in the fourth period, and coordinates of four or more points corresponding one-to-one to the four or more points selected based on the operation from the user among the plurality of points detected from the captured image acquired in the fifth period. Here, among the plurality of points detected from the captured image in the fifth period, the four or more points selected by the user in the third period are searched for. The projector 1 corrects the projection image GP2 based on the projective transformation matrix. The correction of the projection image using the projective transformation matrix generated based on the coordinates of the plurality of points detected from the captured image may be referred to as a "second correction".

Figure 6:
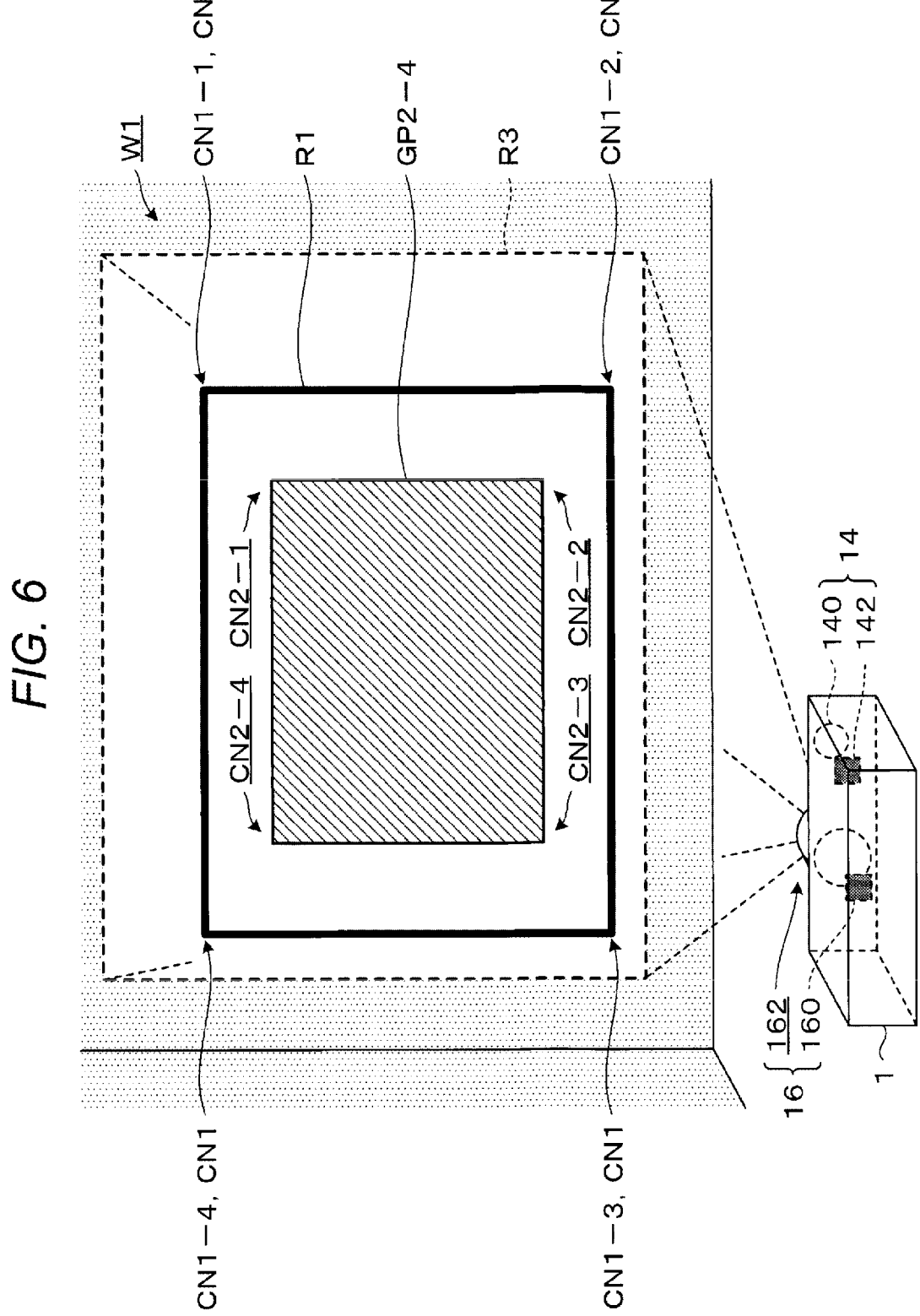
FIG. 6 is a schematic diagram showing a state in which the projection image GP2 is displayed in a sixth period.

FIG. 6 is a schematic diagram showing a state in which the projection image GP2 is displayed in a sixth period. The sixth period is a period after the fifth period. Specifically, the sixth period is a period after the second correction is performed. The projection image GP2 in the sixth period may be referred to as a "projection image GP2-4". The projection image GP2-4 is the projection image GP2 on which the second correction is performed. The projection image GP2-4 is displayed in the area R1.

A position where the projection image GP2-4 is displayed is the same as the position where the projection image GP2-2 is displayed. A shape of the projection image GP2-4 is the same as the shape of the projection image GP2-2. That is, even when the position, the orientation, the angle, and the like of the projector 1 change, by performing the second correction on the projection image GP2-3, the projector 1 can make the position where the projection image GP2-3 is displayed and the shape of the projection image GP2-3 similar to those of the projection image GP2-2, that is, the projection image GP2-3 can be substantially returned to the state of the projection image GP2-2. In other words, by performing the second correction on the projection image GP2, the projector 1 can maintain the same positional relationship between each of the four corners of the area R1 and a respective one of the four corners of the projection image GP2 as in the third period. Specifically, by performing the second correction on the projection image GP2 at a certain cycle, the position of the corner CN2-1 with respect to the corner CN1-1, the position of the corner CN2-2 with respect to the corner CN1-2, the position of the corner CN2-3 with respect to the corner CN1-3, and the position of the corner CN2-4 with respect to the corner CN1-4 can be maintained substantially constant. Therefore, by performing the second correction on the projection image GP2 of this time (in the fifth period), the state of the projection image GP2 of this time can be substantially returned to the state of the projection image GP2 of a previous time (in the third period). In addition, by performing the first correction based on the operation from the user, the projector 1 adjusts the shape of the projection image GP2-2 serving as a reference of the projection image GP2 displayed when the second correction is performed to a shape desired by the user. That is, by performing the second correction on the projection image GP2 on which the first correction is performed at a certain cycle, the user can easily adjust the shape of the projection image GP2-2 without accurately adjusting the position, the orientation, the angle, and the like of the projector 1.

1.2. Configuration and Functions of Projector

Hereinafter, a configuration and functions of the projector 1 according to the first embodiment will be described with reference to FIGS. 7 to 14.

Figure 7:
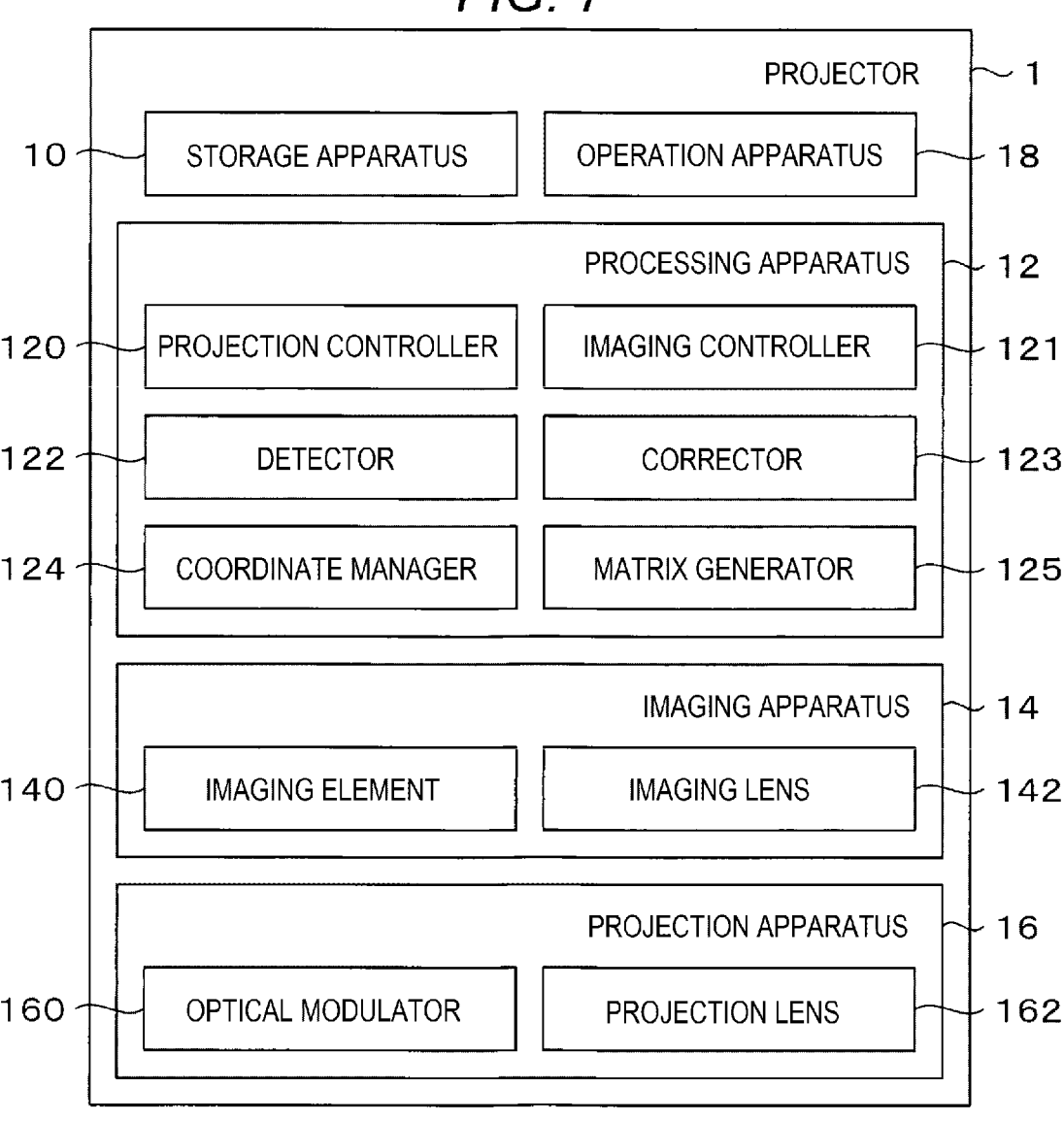
FIG. 7 is a block diagram showing a configuration of a projector 1 according to a first embodiment.

FIG. 7 is a block diagram showing the configuration of the projector 1 according to the first embodiment. The projector 1 includes a storage apparatus 10 that stores various types of information, a processing apparatus 12 that controls an operation of the projector 1, the imaging apparatus 14 that images a range including a predetermined area on the projection surface, the projection apparatus 16 that projects the projection light onto the projection surface, and an operation apparatus 18 that receives an input operation from the user. The processing apparatus 12 has functions as a projection controller 120, an imaging controller 121, a detector 122, a corrector 123, a coordinate manager 124, and a matrix generator 125. As described above, the imaging apparatus 14 includes the imaging element 140 and the imaging lens 142. As described above, the projection apparatus 16 includes the light source (not shown), the optical modulator 160, and the projection lens 162.

The storage apparatus 10 includes a volatile memory such as a RAM and a nonvolatile memory such as a ROM. Here, the RAM is an abbreviation for a random access memory. The ROM is an abbreviation for a read only memory.

Figure 8:
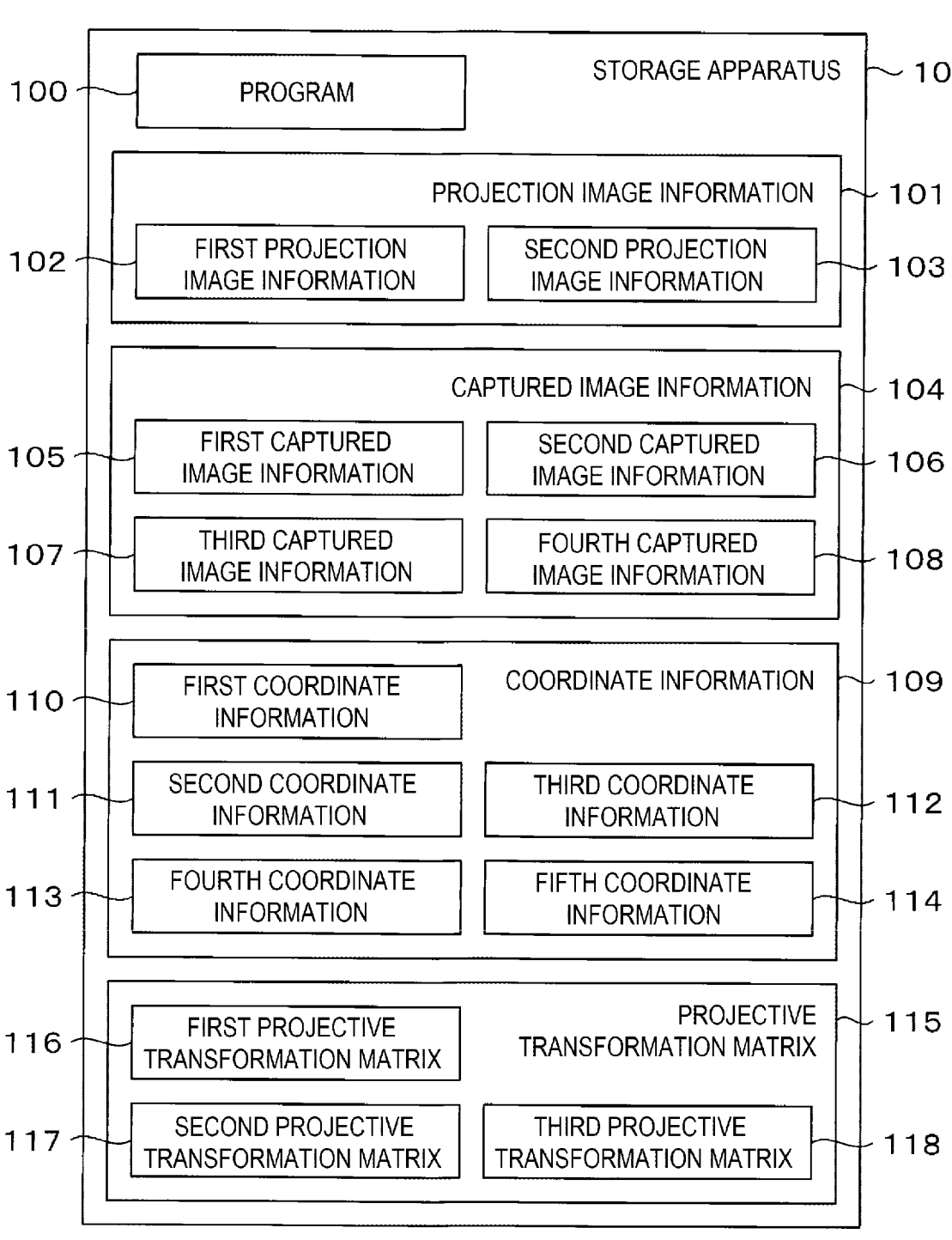
FIG. 8 is a block diagram showing a configuration of a storage apparatus 10 according to the first embodiment.

FIG. 8 is a block diagram showing a configuration of the storage apparatus 10 according to the first embodiment. The nonvolatile memory provided in the storage apparatus 10 stores a program 100 for defining the operation of the projector 1, projection image information 101 representing an image projected onto the projection surface, captured image information 104 representing a result of imaging a range including an area on the projection surface on which the projection image is displayed, coordinate information 109 representing coordinates of points in various images, and a projective transformation matrix 115 used for two-dimensional coordinate transformation, image correction, and the like. The nonvolatile memory provided in the storage apparatus 10 is one example of the non-transitory computer-readable storage medium. As another example of the non-transitory computer-readable storage medium, CD-ROM (Compact Disc Read only Memory) or memory card may be used.

The projection image information 101 includes first projection image information 102 representing an image projected when the projection image GP1 is displayed and second projection image information 103 representing an image projected when the projection image GP2 is displayed.

The captured image information 104 includes first captured image information 105 representing the captured image acquired in the first period, second captured image information 106 representing the captured image acquired in the third period, third captured image information 107 representing the captured image acquired in the fourth period, and fourth captured image information 108 representing the captured image acquired in the fifth period.

The coordinate information 109 includes first coordinate information 110 representing coordinates of a plurality of points in the image indicated by the first projection image information 102, second coordinate information 111 representing coordinates of a plurality of points detected from the image indicated by the first captured image information 105, third coordinate information 112 representing coordinates of a plurality of points detected from the image indicated by the second captured image information 106, fourth coordinate information 113 representing coordinates of a plurality of points detected from the image indicated by the third captured image information 107, and fifth coordinate information 114 representing coordinates of a plurality of points detected from the image indicated by the fourth captured image information 108.

The projective transformation matrix 115 includes a first projective transformation matrix 116 representing the correspondence relationship between the plurality of pixels of the optical modulator 160 in the first period and the plurality of pixels of the imaging element 140 in the first period, a second projective transformation matrix 117 representing the correspondence relationship between the plurality of pixels of the optical modulator 160 in the fourth period and the plurality of pixels of the imaging element 140 in the fourth period, and a third projective transformation matrix 118 used for the second correction.

The volatile memory of the storage apparatus 10 is used as a work area for executing the program 100 in the processing apparatus 12.

A part or all of the storage apparatus 10 may be provided in an external storage apparatus, an external server, or the like. A part or all of the various types of information stored in the storage apparatus 10 may be stored in the storage apparatus 10 in advance, or may be acquired from the external storage apparatus, the external server, or the like.

Referring back to FIG. 7, the processing apparatus 12 includes one or more CPUs. The processing apparatus 12 may include a programmable logic device such as an FPGA instead of or in addition to a CPU. Here, the CPU is an abbreviation for a central processing unit, and the FPGA is an abbreviation for a field-programmable gate array.

By executing the program 100 by the CPU or the like of the processing apparatus 12, the processing apparatus 12 functions as the projection controller 120, the imaging controller 121, the detector 122, the corrector 123, the coordinate manager 124, and the matrix generator 125 shown in FIG. 7.

The projection controller 120 controls the projection apparatus to project projection light for displaying an image onto the projection surface. Specifically, the projection controller 120 displays the projection image on the projection surface by causing the projection apparatus to project the projection light based on the projection image information 101. In other words, the projection controller 120 displays the projection image on the projection surface by projecting the image indicated by the projection image information 101 from the projection apparatus. In addition, the projection controller 120 controls the projection apparatus to display, on the projection surface, an image for assisting the operation of the user.

In the embodiment, the projection controller 120 controls the projection apparatus 16 to project the projection light for displaying an image onto the wall surface W1.

Specifically, the projection controller 120 displays the projection image on the wall surface W1 by causing the projection apparatus 16 to project the projection light based on the projection image information 101. More specifically, the projection controller 120 displays the projection image GP1 on the wall surface W1 by causing the projection apparatus 16 to project the projection light based on the first projection image information 102. The projection controller 120 displays the projection image GP2 on the wall surface W1 by causing the projection apparatus 16 to project the projection light based on the second projection image information 103.

The projection controller 120 controls the projection apparatus 16 to display, on the wall surface W1, the pointer image GC1 located at the corner of the projection image GP2.

The projection controller 120 controls the projection apparatus 16 to display, on the wall surface W1, the corner image GC2 located at the corner of the area R1 on the wall surface W1. In addition, the projection controller 120 changes the display mode of the corner image GC2 based on the operation from the user.

The projection controller 120 controls the projection apparatus 16 to display, on the wall surface W1, the plurality of instruction images GD corresponding one-to-one to the plurality of points detected from the image indicated by the second captured image information 106. In addition, the projection controller 120 changes the display mode of the instruction image GD based on the operation from the user.

Figure 9:
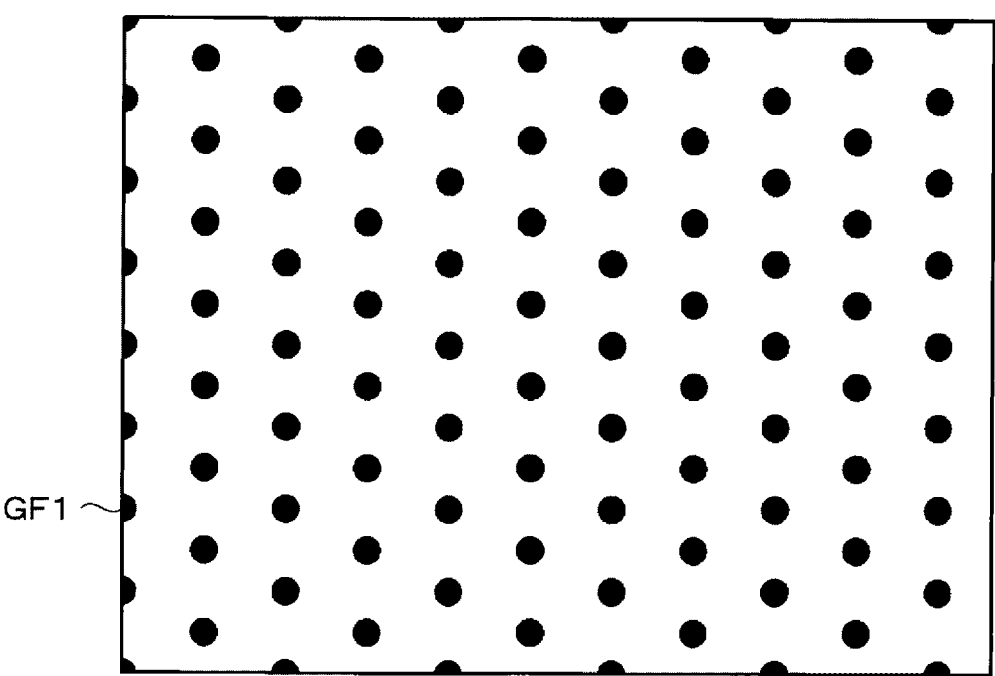
FIG. 9 is a schematic diagram showing an example of an image indicated by first projection image information 102.

FIG. 9 is a schematic diagram showing an example of the image indicated by the first projection image information 102. In the embodiment, the first projection image information 102 represents an image GF1. The projection controller 120 displays the projection image GP1 on the wall surface W1 by causing the projection apparatus 16 to project the projection light based on the first projection image information 102. In other words, the projection controller 120 displays the projection image GP1 on the wall surface W1 by projecting the image GF1 indicated by the first projection image information 102 from the projection apparatus 16.

The image GF1 includes a plurality of points. The plurality of points in the image GF1 correspond one-to-one to the plurality of points in the projection image GP1.

Referring back to FIG. 7, the imaging controller 121 controls the imaging apparatus to image a range including an area on the projection surface on which the projection image is displayed. The imaging controller 121 acquires a captured image representing a result of the imaging from the imaging apparatus. The imaging controller 121 stores, in the storage apparatus 10, the captured image information 104 representing the acquired captured image.

In the embodiment, the imaging controller 121 controls the imaging apparatus 14 to image a range including the area R2 on the wall surface W1 on which the projection image GP1-1 is displayed. The imaging controller 121 acquires a captured image representing a result of the imaging from the imaging apparatus 14. In addition, the imaging controller 121 stores, in the storage apparatus 10, the first captured image information 105 representing the acquired captured image.

The imaging controller 121 controls the imaging apparatus 14 to image a range including the area R3 on the wall surface W1 on which the projection image GP1-2 is displayed. The imaging controller 121 acquires a captured image representing a result of the imaging from the imaging apparatus 14. In addition, the imaging controller 121 stores, in the storage apparatus 10, the third captured image information 107 representing the acquired captured image.

The imaging controller 121 controls the imaging apparatus 14 to image a range including the area R1 on the wall surface W1 on which the projection image GP2-2 is displayed. The imaging controller 121 acquires a captured image representing a result of the imaging from the imaging apparatus 14. In addition, the imaging controller 121 stores, in the storage apparatus 10, the second captured image information 106 representing the acquired captured image.

The imaging controller 121 controls the imaging apparatus 14 to image a range including the area R1 on the wall surface W1 on which the projection image GP2-3 is displayed. The imaging controller 121 acquires a captured image representing a result of the imaging from the imaging apparatus 14. In addition, the imaging controller 121 stores, in the storage apparatus 10, the fourth captured image information 108 representing the acquired captured image.

The detector 122 detects a point in an image indicated by the various types of image information by performing image processing on the image. That is, the detector 122 acquires the coordinate information 109 representing coordinates of the detected point. The detector 122 stores the acquired coordinate information 109 in the storage apparatus 10.

In the embodiment, the detector 122 detects a plurality of points in the image indicated by the captured image information 104 by performing image processing on the image indicated by the captured image information 104. That is, the detector 122 acquires the coordinate information 109 representing coordinates of the plurality of points in the image indicated by the captured image information 104. The detector 122 stores the acquired coordinate information 109 in the storage apparatus 10.

Specifically, the detector 122 detects a plurality of points in the image indicated by the first captured image information 105 by performing image processing on the image indicated by the first captured image information 105. That is, the detector 122 acquires the second coordinate information 111 representing coordinates of the plurality of points in the image indicated by the first captured image information 105. The detector 122 stores the acquired second coordinate information 111 in the storage apparatus 10.

The detector 122 detects a plurality of points in the image indicated by the second captured image information 106 by performing image processing on the image indicated by the second captured image information 106. That is, the detector 122 acquires the third coordinate information 112 representing coordinates of the plurality of points in the image indicated by the second captured image information 106. The detector 122 stores the acquired third coordinate information 112 in the storage apparatus 10.

The detector 122 detects a plurality of points in the image indicated by the third captured image information 107 by performing image processing on the image indicated by the third captured image information 107. That is, the detector 122 acquires the fourth coordinate information 113 representing coordinates of the plurality of points in the image indicated by the third captured image information 107. The detector 122 stores the acquired fourth coordinate information 113 in the storage apparatus 10.

The detector 122 detects a plurality of points in the image indicated by the fourth captured image information 108 by performing image processing on the image indicated by the fourth captured image information 108. That is, the detector 122 acquires the fifth coordinate information 114 representing coordinates of the plurality of points in the image indicated by the fourth captured image information 108. The detector 122 stores the acquired fifth coordinate information 114 in the storage apparatus 10.

The detector 122 may detect a plurality of points in the image GF1 by performing image processing on the image GF1 indicated by the first projection image information 102. When the plurality of points in the image GF1 are detected, the detector 122 acquires the first coordinate information 110 representing coordinates of the plurality of points in the image GF1 indicated by the first projection image information 102. The detector 122 stores the acquired first coordinate information 110 in the storage apparatus 10. In the embodiment, it is assumed that the first coordinate information 110 is stored in the storage apparatus 10 in advance.

A known image processing technique may be used in the function related to the point detection. Examples of the known image processing technique related to point detection include template matching, center-of-gravity detection, and an algorithm called "AKAZE". In this specification, a detailed technical description related to point detection is omitted.

The coordinate manager 124 manages the coordinates of the point detected from the captured image based on the operation from the user. In addition, the coordinate manager 124 performs various types of processing related to the management of the coordinates of the point detected from the captured image.

In the embodiment, the coordinate manager 124 selects one corner image GC2 among the corner images GC2-1 to GC2-4 based on the operation from the user. In addition, the coordinate manager 124 determines whether an operation related to the management of the coordinates of the point detected from the captured image is received from the user.

Based on an operation from the user for selecting one instruction image GD displayed in a manner distinguishable from the other instruction images GD on the wall surface W1, the coordinate manager 124 selects a point that corresponds to the one instruction image GD, which is a point detected from the image indicated by the second captured image information 106. The coordinate manager 124 updates the third coordinate information 112 based on the operation from the user.

The matrix generator 125 generates the projective transformation matrix 115 based on coordinates of a plurality of points in the correspondence relationship. That is, the matrix generator 125 generates the projective transformation matrix 115 based on the coordinate information 109.

In the embodiment, the matrix generator 125 generates the first projective transformation matrix 116 based on the first coordinate information 110 and the second coordinate information 111. The matrix generator 125 stores the generated first projective transformation matrix 116 in the storage apparatus 10.

The first projective transformation matrix 116 is information indicating the correspondence relationship between the plurality of pixels of the optical modulator 160 in the first period and the plurality of pixels of the imaging element 140 in the first period. Specifically, the first projective transformation matrix 116 is a projective transformation matrix for transforming coordinates of each pixel of the imaging element 140 in the first period into coordinates of each pixel of the optical modulator 160 in the first period. In other words, the first projective transformation matrix 116 is a projective transformation matrix for transforming the coordinates of the pixel of the imaging element 140 before the position, the orientation, the angle, and the like of the projector 1 are changed into the coordinates of the pixel of the optical modulator 160 before the position, the orientation, the angle, and the like of the projector 1 are changed.

The matrix generator 125 generates the second projective transformation matrix 117 based on the first coordinate information 110 and the fourth coordinate information 113. The matrix generator 125 stores the generated second projective transformation matrix 117 in the storage apparatus 10.

The second projective transformation matrix 117 is information indicating the correspondence relationship between the plurality of pixels of the optical modulator 160 in the fourth period and the plurality of pixels of the imaging element 140 in the fourth period. Specifically, the second projective transformation matrix 117 is a projective transformation matrix for transforming the coordinates of each pixel of the imaging element 140 in the fourth period into the coordinates of each pixel of the optical modulator 160 in the fourth period. In other words, the second projective transformation matrix 117 is a projective transformation matrix for transforming the coordinates of the pixel of the imaging element 140 after the position, the orientation, the angle, and the like of the projector 1 are changed into the coordinates of the pixel of the optical modulator 160 after the position, the orientation, the angle, and the like of the projector 1 are changed.

The matrix generator 125 generates the third projective transformation matrix 118 based on the third coordinate information 112, the first projective transformation matrix 116, the fifth coordinate information 114, and the second projective transformation matrix 117. The matrix generator 125 stores the generated third projective transformation matrix 118 in the storage apparatus 10.

The third projective transformation matrix 118 is information indicating a correspondence relationship between the plurality of pixels of the optical modulator 160 in the third period and the plurality of pixels of the optical modulator 160 in the fifth period. Specifically, the third projective transformation matrix 118 is a projective transformation matrix for transforming the coordinates of each pixel of the optical modulator 160 in the third period into the coordinates of each pixel of the optical modulator 160 in the fifth period. In other words, the third projective transformation matrix 118 is a projective transformation matrix for transforming the coordinates of the pixel of the optical modulator 160 before the position, the orientation, the angle, and the like of the projector 1 are changed into the coordinates of the pixel of the optical modulator 160 after the position, the orientation, the angle, and the like of the projector 1 are changed.

The corrector 123 corrects a position and a shape of the projection image displayed on the projection surface. Specifically, the corrector 123 performs the first correction based on the operation from the user. The corrector 123 performs the second correction based on the projective transformation matrix 115 generated by the matrix generator 125.

In the embodiment, the corrector 123 performs the first correction of correcting the projection image GP2 by changing the position of the corner of the projection image GP2 based on the operation from the user for moving the pointer image GC1. In other words, the corrector 123 updates, based on the operation from the user for moving the pointer image GC1, the second projection image information 103 representing the image projected when the projection image GP2 is displayed.

The corrector 123 performs the second correction of correcting the projection image GP2 based on the third projective transformation matrix 118. In other words, the corrector 123 updates, based on the third projective transformation matrix 118, the second projection image information 103 representing the image projected when the projection image GP2 is displayed.

Figure 10:
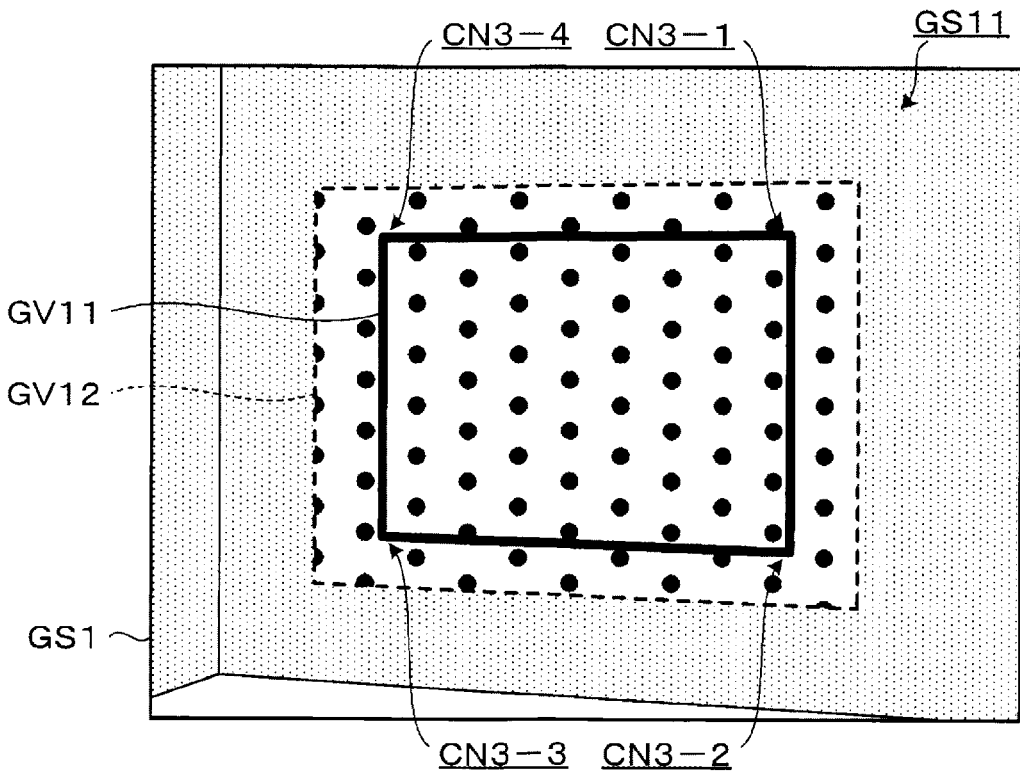
FIG. 10 is a schematic diagram showing an example of an image indicated by first captured image information 105.

FIG. 10 is a schematic diagram showing an example of the image indicated by the first captured image information 105. In the embodiment, the first captured image information 105 represents a captured image GS1.

The captured image GS1 includes an image GS11. The image GS11 is an image representing the wall surface W1. The image GS11 includes an image GV11 and an image GV12.

The image GV11 is an image representing the area R1. The image GV11 has a corner CN3-1, a corner CN3-2, a corner CN3-3, and a corner CN3-4. The corner CN3-1 corresponds to the corner CN1-1. The corner CN3-2 corresponds to the corner CN1-2. The corner CN3-3 corresponds to the corner CN1-3. The corner CN3-4 corresponds to the corner CN1-4.

The image GV12 is an image representing the projection image GP1-1. The image GV12 includes a plurality of points. The second coordinate information 111 represents coordinates of the plurality of points in the image GV12. The plurality of points in the image GV12 correspond one-to-one to the plurality of points in the projection image GP1-1. In addition, the plurality of points in the image GV12 correspond one-to-one to the plurality of points in the image GF1.

Figure 11:
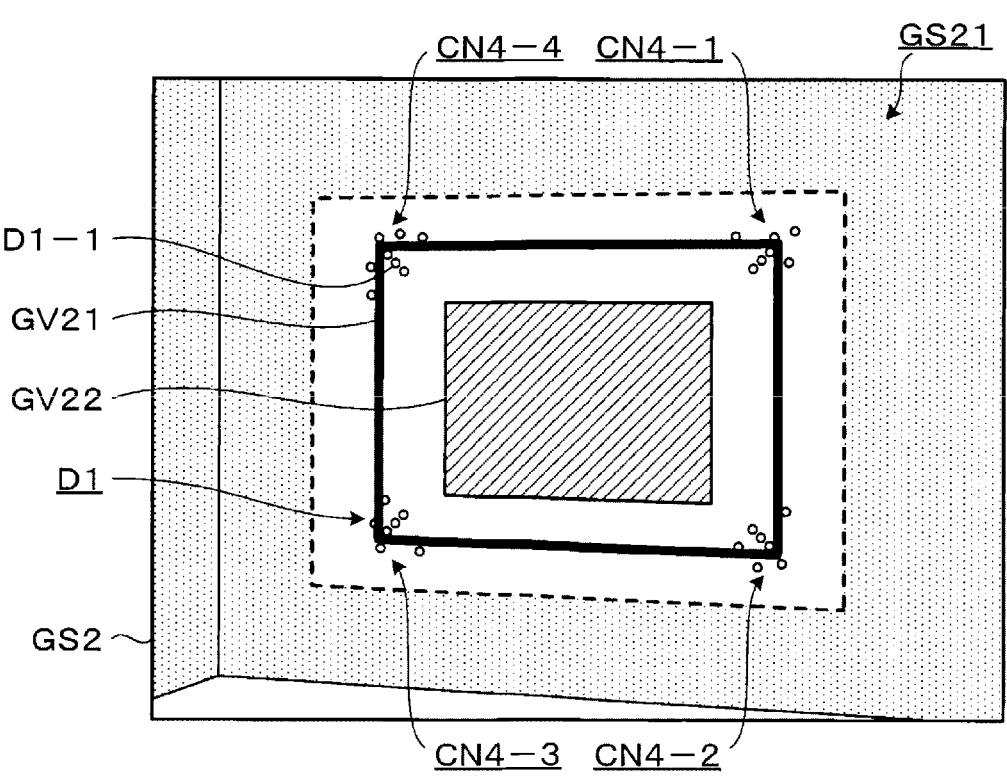
FIG. 11 is a schematic diagram showing an example of an image indicated by second captured image information 106.

FIG. 11 is a schematic diagram showing an example of the image indicated by the second captured image information 106. In the embodiment, the second captured image information 106 represents a captured image GS2.

The captured image GS2 includes an image GS21. The image GS21 is an image representing the wall surface W1. The image GS21 includes an image GV21 and an image GV22.

The image GV21 is an image representing the area R1. The image GV21 has a corner CN4-1, a corner CN4-2, a corner CN4-3, and a corner CN4-4. The corner CN4-1 corresponds to the corner CN1-1. That is, the corner CN4-1 corresponds to the corner image GC2-1. The corner CN4-2 corresponds to the corner CN1-2. That is, the corner CN4-2 corresponds to the corner image GC2-2. The corner CN4-3 corresponds to the corner CN1-3. That is, the corner CN4-3 corresponds to the corner image GC2-3. The corner CN4-4 corresponds to the corner CN1-4. That is, the corner CN4-4 corresponds to the corner image GC2-4. The image GV22 is an image representing the projection image GP2-2.

The captured image GS2 includes a plurality of points D1. The plurality of points D1 correspond one-to-one to the plurality of instruction images GD. The plurality of points D1 include one or more points D1 corresponding to the corner CN4-1, one or more points D1 corresponding to the corner CN4-2, one or more points D1 corresponding to the corner CN4-3, and one or more points D1 corresponding to the corner CN4-4. The plurality of points D1 include a point D1-1. The point D1-1 corresponds to the instruction image GD-1. For example, when the user performs an operation of selecting the instruction image GD-1, the coordinate manager 124 selects the point D1-1 corresponding to the instruction image GD-1. The coordinate manager 124 updates the third coordinate information 112 based on the operation from the user. The third coordinate information 112 updated based on the operation from the user represents coordinates of the point D1 selected based on the operation from the user.

Figure 12:
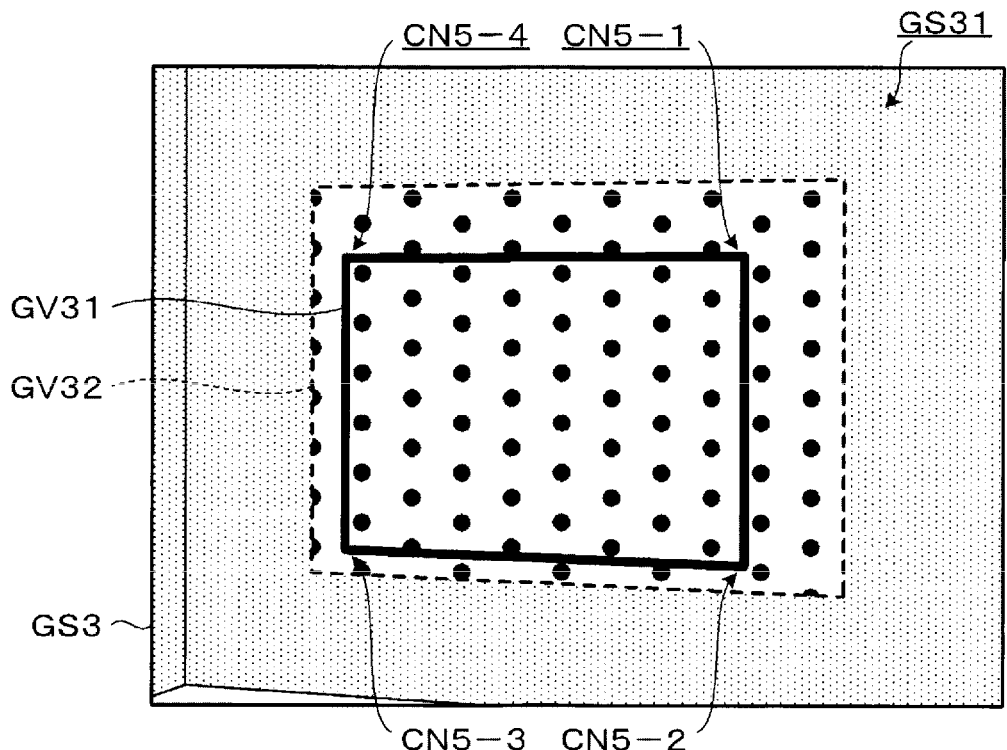
FIG. 12 is a schematic diagram showing an example of an image indicated by third captured image information 107.

FIG. 12 is a schematic diagram showing an example of the image indicated by the third captured image information 107. In the embodiment, the third captured image information 107 represents a captured image GS3.

The captured image GS3 includes an image GS31. The image GS31 is an image representing the wall surface W1. The image GS31 includes an image GV31 and an image GV32.

The image GV31 is an image representing the area R1. The image GV31 has a corner CN5-1, a corner CN5-2, a corner CN5-3, and a corner CN5-4. The corner CN5-1 corresponds to the corner CN1-1. The corner CN5-2 corresponds to the corner CN1-2. The corner CN5-3 corresponds to the corner CN1-3. The corner CN5-4 corresponds to the corner CN1-4.

The image GV32 is an image representing the projection image GP1-2. The image GV32 includes a plurality of points. The fourth coordinate information 113 represents coordinates of the plurality of points in the image GV32. The plurality of points in the image GV32 correspond one-to-one to the plurality of points in the projection image GP1-2. The plurality of points in the image GV32 correspond one-to-one to the plurality of points in the image GF1.

Figure 13:
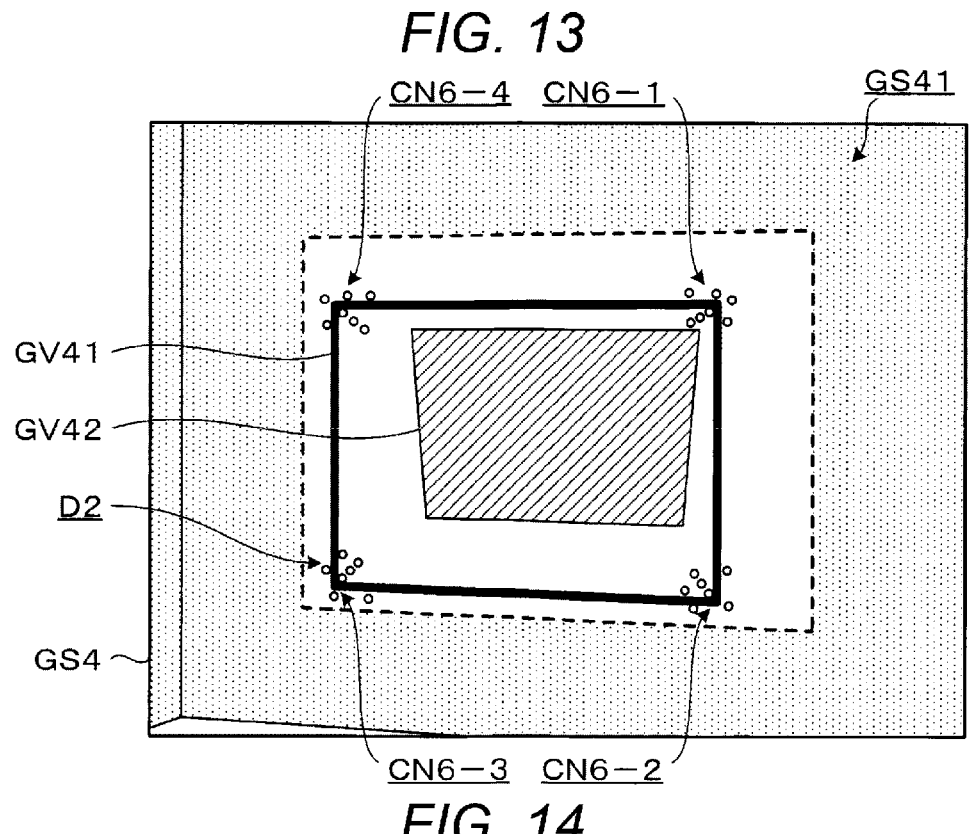
FIG. 13 is a schematic diagram showing an example of an image indicated by fourth captured image information 108.

FIG. 13 is a schematic diagram showing an example of the image indicated by the fourth captured image information 108. In the embodiment, the fourth captured image information 108 represents a captured image GS4.

The captured image GS4 includes an image GS41. The image GS41 is an image representing the wall surface W1. The image GS41 includes an image GV41 and an image GV42.

The image GV41 is an image representing the area R1. The image GV41 has a corner CN6-1, a corner CN6-2, a corner CN6-3, and a corner CN6-4. The corner CN6-1 corresponds to the corner CN1-1. The corner CN6-2 corresponds to the corner CN1-2. The corner CN6-3 corresponds to the corner CN1-3. The corner CN6-4 corresponds to the corner CN1-4. The image GV42 is an image representing the projection image GP2-3.

The captured image GS4 includes a plurality of points D2. The plurality of points D2 include one or more points D2 corresponding to the corner CN6-1, one or more points D2 corresponding to the corner CN6-2, one or more points D2 corresponding to the corner CN6-3, and one or more points D2 corresponding to the corner CN6-4. The fifth coordinate information 114 represents coordinates of the plurality of points D2.

Figure 14:
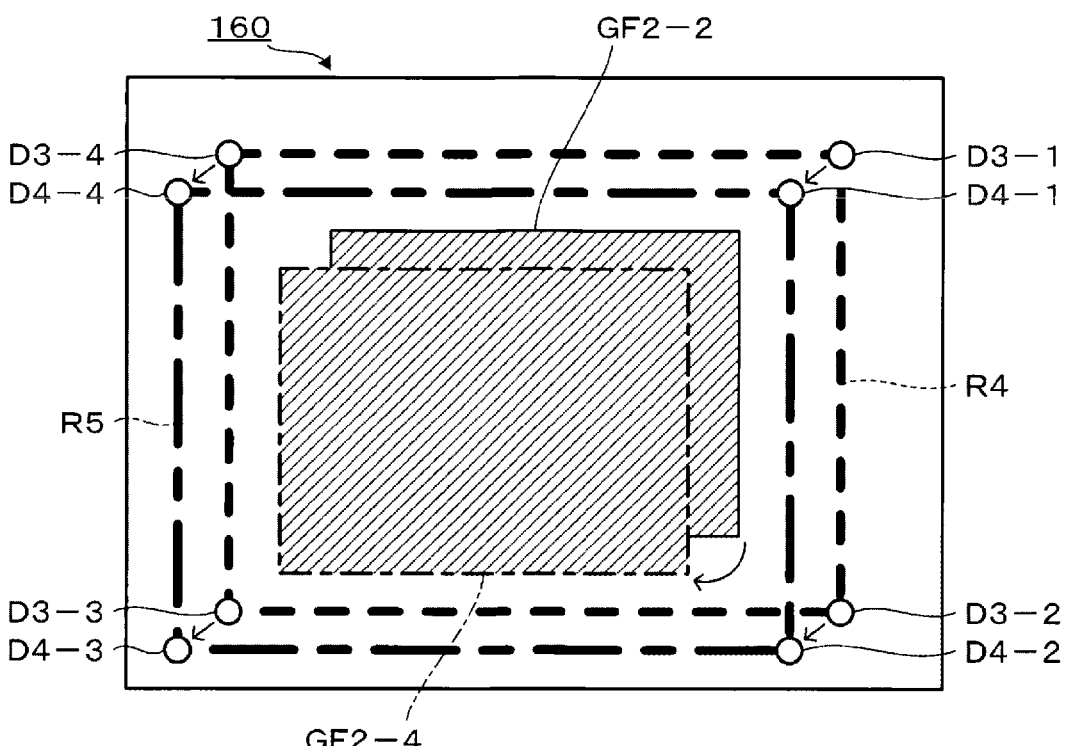
FIG. 14 is a schematic diagram showing a second correction.

FIG. 14 is a schematic diagram showing the second correction. FIG. 14 shows images displayed on the optical modulator 160 before and after the second correction. An image GF2-2 is an image displayed on the optical modulator 160 in the third period and the fifth period. That is, the image GF2-2 is an image indicated by the second projection image information 103 updated by the first correction. The image GF2-2 is an image before the second correction is performed. An image GF2-4 is an image displayed on the optical modulator 160 in the sixth period. That is, the image GF2-4 is an image indicated by the second projection image information 103 updated by the first correction and the second correction. The corrector 123 corrects the image GF2-2 to the image GF2-4 based on the third projective transformation matrix 118.

A point D3-1 is a point obtained by transforming coordinates of a point located at the corner CN4-1 of the image GV21 in the captured image GS2 by the first projective transformation matrix 116. Similarly, a point D3-2 is a point obtained by transforming coordinates of a point located at the corner CN4-2 of the image GV21 in the captured image GS2 by the first projective transformation matrix 116. A point D3-3 is a point obtained by transforming coordinates of a point located at the corner CN4-3 of the image GV21 in the captured image GS2 by the first projective transformation matrix 116. A point D3-4 is a point obtained by transforming coordinates of a point located at the corner CN4-4 of the image GV21 in the captured image GS2 by the first projective transformation matrix 116. An area R4 is an area surrounded by a quadrangle having the points D3-1, D3-2, D3-3, and D3-4 as vertices. That is, the area R4 is an area on the optical modulator 160 corresponding to the area R1 in the third period indicated by the image GV21. The image GF2-2 is displayed inside the area R4.

A point D4-1 is a point obtained by transforming coordinates of a point located at the corner CN6-1 of the image GV41 in the captured image GS4 by the second projective transformation matrix 117. Similarly, a point D4-2 is a point obtained by transforming coordinates of a point located at the corner CN6-2 of the image GV41 in the captured image GS4 by the second projective transformation matrix 117. A point D4-3 is a point obtained by transforming coordinates of a point located at the corner CN6-3 of the image GV41 in the captured image GS4 by the second projective transformation matrix 117. A point D4-4 is a point obtained by transforming coordinates of a point located at the corner CN6-4 of the image GV41 in the captured image GS4 by the second projective transformation matrix 117. An area R5 is an area surrounded by a quadrangle having the points D4-1, D4-2, D4-3, and D4-4 as vertices. That is, the area R5 is an area on the optical modulator 160 corresponding to the area R1 in the fifth period indicated by the image GV41.

The third projective transformation matrix 118 used for the second correction is a matrix for transforming coordinates of the point D3-1 to coordinates of the point D4-1, coordinates of the point D3-2 to coordinates of the point D4-2, coordinates of the point D3-3 to coordinates of the point D4-3, and coordinates of the point D3-4 to coordinates of the point D4-4. Therefore, when the image GF2-2 is corrected to the image GF2-4 based on the third projective transformation matrix 118, a positional relationship between four corners of the image GF2-2 and four corners of the area R4 is taken over as a positional relationship between four corners of the image GF2-4 and four corners of the area R5. As a result, in the sixth period, when the projection image GP2-4 is displayed on the wall surface W1 by displaying the image GF2-4 on the optical modulator 160, a positional relationship between the corners CN1-1 to CN1-4 of the area R1 and the corners CN2-1 to CN2-4 of the projection image GP2 is maintained as in the third period.

Referring back to FIG. 7, the imaging element 140 is an image sensor such as a CCD or a CMOS. Here, the CCD is an abbreviation for a charge coupled device, and the CMOS is an abbreviation for a complementary metal oxide semiconductor.

Under control of the imaging controller 121, the imaging apparatus 14 images a range including an area on the projection surface on which the projection image is displayed. The imaging apparatus 14 outputs, to the processing apparatus 12, the captured image information 104 representing a result of imaging the range including the area on the projection surface on which the projection image is displayed. In other words, the imaging apparatus 14 outputs the captured image indicated by the captured image information 104 to the processing apparatus 12.

The optical modulator 160 includes, for example, one or more liquid crystal panels. The optical modulator 160 may include a DMD instead of a liquid crystal panel. The optical modulator 160 modulates, based on a signal received from the processing apparatus 12, light emitted from the light source into the projection light for displaying the projection image on the projection surface. Examples of the light source include a halogen lamp, a xenon lamp, an ultra-high pressure mercury lamp, an LED, and a laser light source. Here, the LED is an abbreviation for a light emitting diode, and the DMD is an abbreviation for a digital mirror device.

Under control of the projection controller 120, the projection apparatus 16 projects the projection light for displaying the projection image onto the projection surface. In other words, the projection apparatus 16 projects an image received from the processing apparatus 12 onto the projection surface.

The operation apparatus 18 receives an input operation on the projector 1 from the user of the projector 1. The operation apparatus 18 includes, for example, a touch panel or an operation button provided on a housing of the projector 1. When the operation apparatus 18 includes the touch panel, the operation apparatus 18 outputs data indicating a detected touched position to the processing apparatus 12. When the operation apparatus 18 includes the operation button, the operation apparatus 18 outputs data for identifying a pressed button to the processing apparatus 12. The operation apparatus 18 may include a reception apparatus for receiving an operation signal output from a remote controller based on an operation of the user. When the operation apparatus 18 includes the reception apparatus, the operation apparatus 18 outputs, to the processing apparatus 12, data indicated by the operation signal received from the remote controller. Accordingly, contents of the input operation on the projector 1 are transmitted to the processing apparatus 12.

1.3. Operation of Projector

Hereinafter, an operation of the projector 1 according to the first embodiment will be described with reference to FIGS. 15 and 16.

Figure 15:
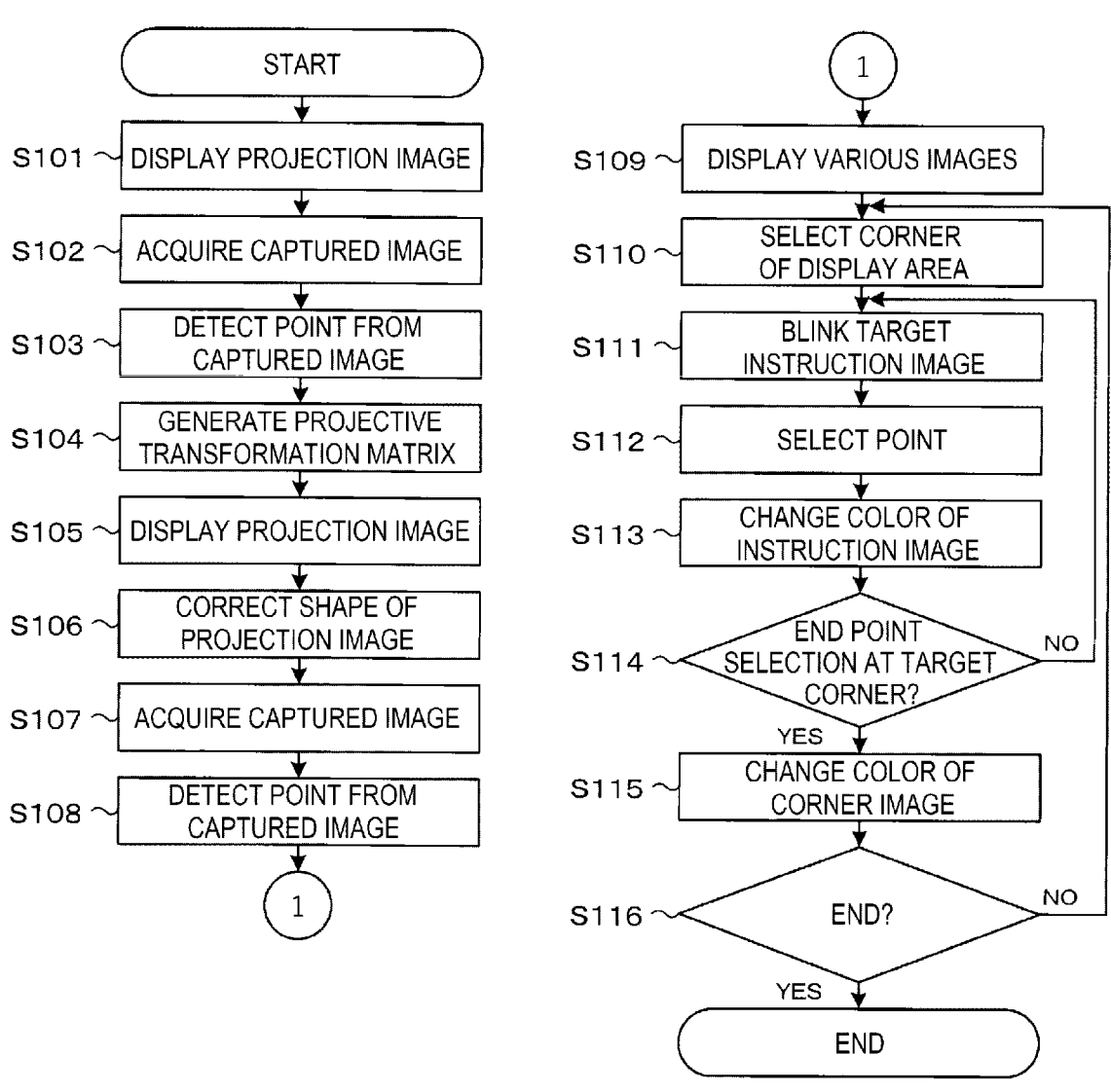
FIG. 15 is a flowchart showing an operation of the projector 1 in a time period including the first period to the third period.

FIG. 15 is a flowchart showing the operation of the projector 1 in a time period including the first period to the third period. A series of operations shown in the flowchart in FIG. 15 are operations for preparing for the second correction. The series of operations shown in the flowchart in FIG. 15 are started, for example, when the projector 1 is powered on and the operation apparatus 18 receives an input operation related to start of the operation from the user of the projector 1.

In step S101, the projection controller 120 displays the projection image GP1-1 in the area R2 on the wall surface W1 by causing the projection apparatus 16 to project the projection light based on the first projection image information 102.

In step S102, the imaging controller 121 controls the imaging apparatus 14 to image a range including the area R2 on the wall surface W1 on which the projection image GP1-1 is displayed. The imaging controller 121 acquires the captured image GS1 representing a result of the imaging from the imaging apparatus 14. In addition, the imaging controller 121 stores, in the storage apparatus 10, the first captured image information 105 representing the acquired captured image GS1.

In step S103, the detector 122 detects a plurality of points in the captured image GS1 by performing image processing on the captured image GS1 indicated by the first captured image information 105. That is, the detector 122 acquires the second coordinate information 111 representing coordinates of the plurality of points in the captured image GS1. The detector 122 stores the acquired second coordinate information 111 in the storage apparatus 10.

In step S104, the matrix generator 125 generates the first projective transformation matrix 116 based on the first coordinate information 110 and the second coordinate information 111. The matrix generator 125 stores the generated first projective transformation matrix 116 in the storage apparatus 10.

In step S105, the projection controller 120 displays the projection image GP2-1 in the area R1 on the wall surface W1 by causing the projection apparatus 16 to project the projection light based on the second projection image information 103. The projection controller 120 controls the projection apparatus 16 to display, on the wall surface W1, the pointer image GC1 located at the corner of the projection image GP2-1. That is, the projection controller 120 controls the projection apparatus 16 to display the pointer image GC1-1 indicating the position of the corner CN2-1, the pointer image GC1-2 indicating the position of the corner CN2-2, the pointer images GC1-3 indicating the position of the corner CN2-3, and the pointer images GC1-4 indicating the position of the corner CN2-4.

In step S106, the corrector 123 performs the first correction of correcting the shape of the projection image GP2 by changing the position of the corner of the projection image GP2-1 based on an operation from the user for moving the pointer image GC1. In other words, the corrector 123 updates the second projection image information 103 based on the operation from the user for moving the pointer image GC1. When the first correction is performed, the projection image GP2-2 is displayed on the wall surface W1.

In step S107, the imaging controller 121 controls the imaging apparatus 14 to image a range including the area R1 on the wall surface W1 on which the projection image GP2-2 is displayed. The imaging controller 121 acquires the captured image GS2 representing a result of the imaging from the imaging apparatus 14. In addition, the imaging controller 121 stores, in the storage apparatus 10, the second captured image information 106 representing the acquired captured image GS2.

In step S108, the detector 122 detects a plurality of points D1 in the captured image GS2 by performing image processing on the captured image GS2 indicated by the second captured image information 106. That is, the detector 122 acquires the third coordinate information 112 representing coordinates of the plurality of points D1 in the captured image GS2. The detector 122 stores the acquired third coordinate information 112 in the storage apparatus 10.

In step S109, the projection controller 120 controls the projection apparatus 16 to display, on the wall surface W1, the corner image GC2 located at the corner of the area R1 on the wall surface W1. That is, the projection controller 120 controls the projection apparatus 16 to display the corner image GC2-1 indicating the position of the corner CN1-1, the corner image GC2-2 indicating the position of the corner CN1-2, the corner image GC2-3 indicating the position of the corner CN1-3, and the corner image GC2-4 indicating the position of the corner CN1-4. The projection controller 120 controls the projection apparatus 16 to display, on the wall surface W1, the plurality of instruction images GD corresponding one-to-one to the plurality of points D1.

In step S110, the coordinate manager 124 selects one corner image GC2 among the corner images GC2-1 to GC2-4 based on the operation from the user. In other words, the coordinate manager 124 selects, based on the operation from the user, the corner of the area R1 indicated by one corner image GC2 among the corner images GC2-1 to GC2-4.

In step S111, the projection controller 120 controls the projection apparatus 16 to repeatedly blink one instruction image GD serving as the selection candidate determined from one or more instruction images GD corresponding to the corner of the area R1 indicated by the one corner image GC2 selected based on the operation from the user, thereby displaying the instruction image GD in a manner distinguishable from the other instruction images GD.

In step S112, the coordinate manager 124 selects the point D1 corresponding to the one instruction image GD based on an operation from the user for selecting the one instruction image displayed in a manner distinguishable from the other instruction images GD. The coordinate manager 124 updates the third coordinate information 112 based on the operation from the user.

In step S113, the projection controller 120 controls the projection apparatus 16 to change a color of the instruction image GD corresponding to the point D1 selected based on the operation from the user.

In step S114, the coordinate manager 124 determines whether an operation from the user for ending the selection of the one or more instruction images GD at the corner of the area R1 indicated by the one corner image GC2 selected based on the operation from the user is received. In other words, the coordinate manager 124 determines whether the operation from the user for ending the selection of one or more points D1 at the corner of the image GV21 corresponding to the one corner image GC2 selected based on the operation from the user is received. When the operation from the user for ending the selection of the one or more points D1 at the corner of the image GV21 corresponding to the one corner image GC2 selected based on the operation from the user is received, that is, when it is YES in step S114, the coordinate manager 124 advances the processing to step S115. When the operation from the user for ending the selection of the one or more points D1 at the corner of the image GV21 corresponding to the one corner image GC2 selected based on the operation from the user is not received, that is, when it is NO in step S114, the coordinate manager 124 advances the processing to step S111.

When the result of the determination in step S114 is NO, the processing apparatus 12 continues the selection of the point D1 based on the operation from the user by performing the operations in steps S111 to S113 again.

In step S115, the projection controller 120 controls the projection apparatus 16 to change a color of the one corner image GC2 selected based on the operation from the user.

In step S116, the coordinate manager 124 determines whether an operation from the user for ending the selection of the instruction image GD is received. That is, the coordinate manager 124 determines whether an operation from the user for ending the selection of the point D1 is received. When the operation from the user for ending the selection of the point D1 is received, that is, when it is YES in step S116, the processing apparatus 12 including the coordinate manager 124 ends the series of operations shown in the flowchart in FIG. 15. When the operation from the user for ending the selection of the point D1 is not received, that is, when it is NO in step S116, the coordinate manager 124 advances the processing to step S110.

The processing apparatus 12 selects four or more points D1 by repeatedly performing the operations in steps S110 to S115 until the result of the determination in step S116 becomes YES. That is, the processing apparatus 12 selects the four or more points D1 by selecting one or more points D1 from the one or more points D1 corresponding to the corner CN4-1 that has a correspondence relationship with the corner CN1-1 indicated by the corner image GC2-1, selecting one or more points D1 from the one or more points D1 corresponding to the corner CN4-2 that has a correspondence relationship with the corner CN1-2 indicated by the corner image GC2-2, selecting one or more points D1 from the one or more points D1 corresponding to the corner CN4-3 that has a correspondence relationship with the corner CN1-3 indicated by the corner image GC2-3, and selecting one or more points D1 from the one or more points D1 corresponding to the corner CN4-4 that has a correspondence relationship with the corner CN1-4 indicated by the corner image GC2-4.

The processing apparatus 12 may perform processing of thinning out the plurality of points D1, for example, at a stage after step S108 and before step S109. For example, the number of the plurality of points D1 corresponding to the corner CN1-1 is actually about several tens, but when all of the plurality of instruction images GD corresponding thereto are displayed, due to the large number, it is difficult for the user to grasp which point D1 is to be selected. Therefore, the processing apparatus 12 may perform the processing of thinning out the plurality of points D1 by using the fact that each of the plurality of points D1 has a value corresponding to a position in the captured image GS2, that is, feature quantity. The feature quantity is calculated as a result of performing image processing on the captured image GS2 in step S108 in FIG. 15. For example, the processing apparatus 12 does not display a plurality of instruction images GD corresponding to a plurality of points D1 each having feature quantity less than a predetermined threshold value. The plurality of points D1 each having the feature quantity less than the predetermined threshold value are components having a small contribution to control of a position and a shape of the projection image GP, such as points not corresponding to the corner of the area R1.

FIG. 16 is a flowchart showing the operation of the projector 1 in a time period including the fourth period to the sixth period. A series of operations shown in the flowchart in FIG. 16 are operations for performing the second correction. The series of operations shown in the flowchart in FIG. 16 may be started, for example, at regular time intervals, or may be started when an input operation related to start of an operation start is received from the user.

In step S201, the projection controller 120 displays the projection image GP1-2 in the area R3 on the wall surface W1 by causing the projection apparatus 16 to project the projection light based on the first projection image information 102.

In step S202, the imaging controller 121 controls the imaging apparatus 14 to image a range including the area R3 on the wall surface W1 on which the projection image GP1-2 is displayed. The imaging controller 121 acquires the captured image GS3 representing a result of the imaging from the imaging apparatus 14. In addition, the imaging controller 121 stores, in the storage apparatus 10, the third captured image information 107 representing the acquired captured image GS3.

In step S203, the detector 122 detects a plurality of points in the captured image GS3 by performing image processing on the captured image GS3 indicated by the third captured image information 107. That is, the detector 122 acquires the fourth coordinate information 113 representing coordinates of the plurality of points in the captured image GS3. The detector 122 stores the acquired fourth coordinate information 113 in the storage apparatus 10.

In step S204, the matrix generator 125 generates the second projective transformation matrix 117 based on the first coordinate information 110 and the fourth coordinate information 113. The matrix generator 125 stores the generated second projective transformation matrix 117 in the storage apparatus 10.

In step S205, the projection controller 120 displays the projection image GP2-3 in the area R1 on the wall surface W1 by causing the projection apparatus 16 to project the projection light based on the second projection image information 103.

In step S206, the imaging controller 121 controls the imaging apparatus 14 to image a range including the area R1 on the wall surface W1 on which the projection image GP2-3 is displayed. The imaging controller 121 acquires the captured image GS4 representing a result of the imaging from the imaging apparatus 14. In addition, the imaging controller 121 stores, in the storage apparatus 10, the fourth captured image information 108 representing the acquired captured image GS4.

In step S207, the detector 122 detects a plurality of points D2 in the captured image GS4 by performing image processing on the captured image GS4 indicated by the fourth captured image information 108. That is, the detector 122 acquires the fifth coordinate information 114 representing coordinates of the plurality of points D2 in the captured image GS4. The detector 122 stores the acquired fifth coordinate information 114 in the storage apparatus 10.

In step S208, the matrix generator 125 generates the third projective transformation matrix 118 based on the third coordinate information 112, the first projective transformation matrix 116, the fifth coordinate information 114, and the second projective transformation matrix 117. The matrix generator 125 stores the generated third projective transformation matrix 118 in the storage apparatus 10.

After step S207 and before step S208, the processing apparatus 12 may perform a process of searching for points corresponding to the four or more points D1 selected by the user in the third period from the plurality of points D2 detected from the captured image GS4. Specifically, the processing apparatus 12 searches for a point having the same feature quantity as each of the four or more points D1 selected by the user among the plurality of points D2. This is because, when the processing apparatus 12 performs the second correction, it is necessary to accurately check where the four or more points D1 in the captured image GS2 are moved to in the captured image GS4. The processing apparatus 12 can accurately associate, that is, match, the plurality of points D2 in the fifth period with the four or more points D1 in the third period, by using the fact that the point D1 has the feature quantity. Accordingly, a matching error between the plurality of points D2 in the fifth period and the four or more points D1 in the third period is prevented, and generation accuracy of the third projective transformation matrix 118 is further improved.

In step S209, the corrector 123 performs the second correction of correcting the projection image GP2-3 based on the third projective transformation matrix 118. In other words, the corrector 123 updates the second projection image information 103 based on the third projective transformation matrix 118. When the second correction is performed, the projection image GP2-4 is displayed on the wall surface W1.

As described above, according to the first embodiment, the projector 1 corrects the position and the shape of the projection image displayed in the display area by performing the second correction. That is, even when the position, the orientation, the angle, and the like of the projector 1 are changed, the projector 1 can maintain the position where the projection image is displayed and the shape of the projection image to be the same as before the position, the orientation, the angle, and the like of the projector 1 are changed. In other words, the projector 1 can maintain the positional relationship between the four corners of the display area and the four corners of the projection image.

According to the first embodiment, the projector 1 corrects the shape of the projection image displayed in the display area by performing the first correction based on the operation from the user. That is, the projector 1 can display the projection image in the shape desired by the user. The user can easily adjust the shape of the projection image without accurately adjusting the position, the orientation, the angle, and the like of the projector 1.

As described above, the projection method according to the first embodiment includes: controlling the projection apparatus 16 to display the projection image GP2 having the four corners inside the area R1 having the four corners, the area R1 being an area on the wall surface W1; acquiring the captured image GS2 that is the captured image of the range including the area R1 where the projection image GP2 is displayed; detecting, by performing image processing on the captured image GS2, the plurality of points D1 corresponding one-to-one to each of the four corners of the image GV21 indicating the area R1 in the captured image GS2; controlling the projection apparatus 16 to display the pointer image GC1 for adjusting the shape of the projection image GP2, the pointer image GC1 being located at the corner of the projection image GP2; performing the first correction of correcting the shape of the projection image GP2 by changing the position of the corner of the projection image GP2 based on the operation from the user for moving the pointer image GC1; and performing, based on the plurality of points D1, the second correction for maintaining the positional relationship between the four corners of the area R1 and the four corners of the projection image GP2 determined by the first correction.

The program 100 according to the first embodiment causes the processing apparatus 12 to control the projection apparatus 16 to display the projection image GP2 having the four corners inside the area R1 having the four corners, the area R1 being an area on the wall surface W1, acquire the captured image GS2 that is the captured image of the range including the area R1 where the projection image GP2 is displayed, detect, by performing image processing on the captured image GS2, the plurality of points D1 corresponding one-to-one to each of the four corners of the image GV21 indicating the area R1 in the captured image GS2, control the projection apparatus 16 to display the pointer image GC1 for adjusting the shape of the projection image GP2, the pointer image GC1 being located at the corner of the projection image GP2, perform the first correction of correcting the shape of the projection image GP2 by changing the position of the corner of the projection image GP2 based on the operation from the user for moving the pointer image GC1, and perform, based on the plurality of points D1, the second correction for maintaining the positional relationship between the four corners of the area R1 and the four corners of the projection image GP2 determined by the first correction.

That is, by performing the first correction based on the operation from the user, the projector 1 corrects the shape of the projection image GP2 to the shape desired by the user. The projector 1 maintains the position where the projection image GP2 is displayed and the shape of the projection image GP2 by performing the second correction. Accordingly, the projector 1 can maintain the shape of the projection image GP2 in the shape desired by the user. The first correction is performed based on the operation of the user. Therefore, the user can easily adjust the shape of the projection image GP2 without accurately adjusting the position, the orientation, the angle, and the like of the projector 1.

In the first embodiment, the projection apparatus 16 is an example of a "projection apparatus", the wall surface W1 is an example of a "projection surface", the area R1 is an example of a "display area", the projection image GP2 is an example of a "projection image", the captured image GS2 is an example of a "first captured image", the image GV21 is an example of a "first image", the point D1 is an example of a "first feature point", the plurality of points D1 are an example of a "plurality of first feature points", the pointer image GC1 is an example of a "pointer image", the program 100 is an example of a "program", and the processing apparatus 12 is an example of a "processing apparatus". The corners CN1-1 to CN1-4 are an example of four corners of "the display area having four corners". The corners CN2-1 to CN2-4 are an example of four corners of "the projection image having four corners". The corners CN4-1 to CN4-4 are an example of "four corners of the first image".

In the projection method according to the first embodiment, the four corners of the image GV21 include the corner CN4-1, the corner CN4-2, the corner CN4-3, and the corner CN4-4. The plurality of points D1 include the one or more points D1 corresponding to the corner CN4-1, the one or more points D1 corresponding to the corner CN4-2, the one or more points D1 corresponding to the corner CN4-3, and the one or more points D1 corresponding to the corner CN4-4. The projection method further includes: controlling the projection apparatus 16 to display, on the wall surface W1, the plurality of instruction images GD corresponding one-to-one to the plurality of points D1; controlling the projection apparatus 16 to display one instruction image GD among the plurality of instruction images GD in a manner distinguishable from the other instruction images GD on the wall surface W1; setting, in response to the user operation of selecting the one instruction image GD among the plurality of instruction images GD displayed on the wall surface W1, one point D1 corresponding to the selected one instruction image GD as the point D1 for performing the second correction; receiving the user operation of selecting of four or more points D1, which includes selecting one or more points D1 from the one or more points D1 corresponding to the corner CN4-1, selecting one or more points D1 from the one or more points D1 corresponding to the corner CN4-2, selecting one or more points D1 from the one or more points D1 corresponding to the corner CN4-3, and selecting one or more points D1 from the one or more points D1 corresponding to the corner CN4-4, to set the plurality of points D1 for performing the second correction, where performing the second correction includes acquiring the captured image GS4 representing the result of imaging the range including the area R1 where the projection image GP2 subjected to the first correction is displayed, and detecting, by performing image processing on the captured image GS4, the plurality of points D2, one or more of which corresponds to each of the four corners of the image GV41 indicating the area R1 in the captured image GS4, and the second correction is performed based on coordinates of the four or more points D1 and coordinates of the plurality of points D2.

When the number of points D1 detected by the image processing is large, the points D1 are not associated well with the points D2, and generation accuracy of the third projective transformation matrix 118 used for the second correction may decrease. Therefore, it is preferable that the user selects the plurality of detected points D1. The projector 1 displays the plurality of instruction images GD corresponding one-to-one to the plurality of detected points D1. In addition, the projector 1 selects the plurality of points D1 based on the operation from the user for selecting the instruction image GD and performs the second correction based on coordinates of the plurality of selected points D1. Accordingly, the projector 1 can accurately generate the third projective transformation matrix 118 used for the second correction and can more accurately maintain the shape of the projection image GP2 in the shape desired by the user.

In the first embodiment, the corner CN4-1 is an example of a "first corner", the corner CN4-2 is an example of a "second corner", the corner CN4-3 is an example of a "third corner", the corner CN4-4 is an example of a "fourth corner", the plurality of instruction images GD is an example of a "plurality of instruction images", the one instruction image GD is an example of "one instruction image", the captured image GS4 is an example of a "second captured image", the image GV41 is an example of a "second image", the point D2 is an example of a "second feature point", and the plurality of points D2 are an example of a "plurality of second feature points". In addition, the corners CN6-1 to CN6-4 are an example of "four corners of the second image".

The projection method according to the first embodiment further includes: controlling the projection apparatus 16 to display, on the wall surface W1, the four corner images GC2 corresponding one-to-one to the four corners of the area R1; and changing the display mode of the corner image GC2-1 corresponding to the corner CN4-1 among the four corner images GC2 when the selection of the one or more points D1 is completed at the corner CN4-1. The four corners of the image GV21 correspond one-to-one to the four corner images GC2.

Accordingly, the user can easily distinguish between a corner at which the selection of the point D1 is completed and a corner at which the selection of the point D1 is not completed.

In the first embodiment, the four corner images GC2 are an example of "four corner images", and the corner image GC2-1 is an example of "one corner image".

The projection method according to the first embodiment further includes changing the display mode of the one instruction image GD in response to selection of the one point D1.

Accordingly, the user can easily distinguish between an instruction image GD corresponding to a selected point D1 and an instruction image GD corresponding to an unselected point D1.

In the projection method according to the first embodiment, displaying one instruction image GD among the plurality of instruction images GD in a manner distinguishable from the other instruction images GD on the wall surface W1 includes displaying the one instruction image GD in a display mode that changes over time.

For example, the projector 1 repeatedly blinks the one instruction image GD serving as the selection candidate of the user, thereby changing the display mode of the instruction image GD over time. Accordingly, the user can easily distinguish the one instruction image GD serving as the selection candidate from the other instruction images GD.

In the projection method according to the first embodiment, displaying the one instruction image GD among the plurality of instruction images GD in a manner distinguishable from the other instruction images GD on the wall surface W1 includes displaying the one instruction image GD in a display mode different from the pointer image GC1.

Accordingly, the user can easily distinguish between the instruction image GD and the pointer image GC1.

2. MODIFICATIONS

The above-described embodiment can be variously modified. Specific modifications are shown below. Two or more aspects optionally selected from the following examples may be combined as appropriate within a range in which the aspects do not contradict each other. In each modification shown below, reference numerals used in the description above are used for elements having actions and functions equivalent to those in the above-described embodiment, and a detailed description thereof will be omitted as appropriate.

2.1. Modification 1

In the above-described embodiment, the case where the color of the instruction image GD corresponding to the one point D1 is changed in response to the selection of the one point D1 is shown as an example, but the disclosure is not limited to such an aspect. For example, a shape of the instruction image GD corresponding to the one point D1 may be changed in response to the selection of the one point D1. In addition, a size of the instruction image GD corresponding to the one point D1 may be changed in response to the selection of the one point D1.

2.2. Modification 2

In the above-described embodiment and modification, the case in which the color of the one corner image GC2 is changed when the operation apparatus 18 receives the operation from the user for ending the selection of the one or more points D1 at the corner of the image GV21 corresponding to the one corner image GC2 selected based on the operation from the user is shown as an example, but the disclosure is not limited to such an aspect. For example, when the operation apparatus 18 receives the operation from the user for ending the selection of the one or more points D1 at the corner of the image GV21 corresponding to the one corner image GC2 selected based on the operation from the user, a shape of the one corner image GC2 may be changed. In addition, when the operation apparatus 18 receives the operation from the user for ending the selection of the one or more points D1 at the corner of the image GV21 corresponding to the one corner image GC2 selected based on the operation from the user, a size of the one corner image GC2 may be changed.

2.3. Modification 3

In the above-described embodiment and modifications, the case where the projector 1 implements the projection method according to the disclosure is shown as an example, but the disclosure is not limited to such an aspect. For example, the projection method according to the disclosure may be implemented by a projection system including an information processing apparatus having the same functions as the processing apparatus 12 and a projector communicably coupled to the information processing apparatus.

2.4. Modification 4

In the above-described embodiment and modifications, the case where the projection image GP1 is an image having a so-called polka dot pattern is shown as an example, but the disclosure is not limited to such an aspect. The projection image GP1 may be, for example, an image having a so-called grid pattern in which a plurality of straight lines parallel to a longitudinal direction of the image and a plurality of straight lines parallel to a transverse direction of the image are drawn. In addition, the projection image GP1 may be an image having a so-called checker pattern.

2.5. Modification 5

In the above-described embodiment and modifications, the case where the second captured image information 106 represents the captured image acquired in the third period, that is, the captured image acquired after the first correction is performed is shown as an example, but the disclosure is not limited to such an aspect. The second captured image information 106 may be a captured image acquired before the first correction is performed.

2.6. Modification 6

A part or all of the control performed by the projector 1 may be performed by the processing apparatus 12. A part or all of the control performed by the processing apparatus 12 may be performed by the projector 1.

3. APPENDIX

Hereinafter, a summary of the disclosure will be described as appendices.

3.1. Appendix 1

A projection method including: displaying, by controlling a projection apparatus, a projection image having four corners inside a display area having four corners, the display area being an area on a projection surface; acquiring a first captured image that is a captured image of a range including the display area where the projection image is displayed; detecting, by performing image processing on the first captured image, a plurality of first feature points corresponding one-to-one to each of four corners of a first image indicating the display area in the first captured image; displaying, by controlling the projection apparatus, a pointer image for adjusting a shape of the projection image, the pointer image being located at a corner of the projection image; performing a first correction of correcting the shape of the projection image by changing a position of the corner of the projection image based on a user operation for moving the pointer image; and performing, based on the plurality of first feature points, a second correction for maintaining a positional relationship between the four corners of the display area and the four corners of the projection image determined by the first correction.

That is, by performing the first correction based on the operation from a user, a projector or a projection system that implements the projection method described in Appendix 1 corrects the shape of the projection image to a shape desired by the user. The projector or the projection system that implements the projection method described in Appendix 1 maintains a position where the projection image is displayed and the shape of the projection image by performing the second correction. Accordingly, the projector or the projection system that implements the projection method described in Appendix 1 can maintain the shape of the projection image in the shape desired by the user. The first correction is performed based on the operation of the user. Therefore, the user can easily adjust the shape of the projection image without accurately adjusting a position, an orientation, an angle, and the like of the projector.

3.2. Appendix 2

The projection method according to Appendix 1, in which the four corners of the first image include a first corner, a second corner, a third corner, and a fourth corner, the plurality of first feature points include one or more first feature points corresponding to the first corner, one or more first feature points corresponding to the second corner, one or more first feature points corresponding to the third corner, and one or more first feature points corresponding to the fourth corner, and the projection method further includes: displaying, by controlling the projection apparatus, on the projection surface, a plurality of instruction images corresponding one-to-one to the plurality of first feature points; displaying, by controlling the projection apparatus, one instruction image among the plurality of instruction images in a manner distinguishable from the other instruction images on the projection surface; setting, in response to a user operation of selecting the one instruction image among the plurality of instruction images displayed on the projection surface, one first feature point corresponding to the selected one instruction image as the first feature point for performing the second correction; receiving a user operation of selecting four or more first feature points, which includes selecting one or more first feature points from the one or more first feature points corresponding to the first corner, selecting one or more first feature points from the one or more first feature points corresponding to the second corner, selecting one or more first feature points from the one or more first feature points corresponding to the third corner, and selecting one or more first feature points from the one or more first feature points corresponding to the fourth corner, to set the plurality of first feature points for performing the second correction; and performing the second correction includes acquiring a second captured image representing a result of imaging a range including the display area where the projection image subjected to the first correction is displayed, and detecting, by performing image processing on the second captured image, a plurality of second feature points, one or more of which corresponds to each of four corners of a second image indicating the display area in the second captured image, and the second correction is performed based on coordinates of the four or more first feature points and coordinates of the plurality of second feature points.

When the number of the first feature points detected by the image processing is large, the first feature points are not associated well with the second feature points, and generation accuracy of a projective transformation matrix used for the second correction may decrease. Therefore, it is preferable that the user rejects and selects the plurality of detected first feature points. The projector or the projection system that implements the projection method described in Appendix 2 displays the plurality of instruction images corresponding one-to-one to the detected plurality of first feature points. In addition, the projector or the projection system that implements the projection method described in Appendix 2 selects the plurality of first feature points based on the operation from the user for selecting the instruction image and performs the second correction based on the coordinates of the plurality of selected first feature points. Accordingly, the projector or the projection system that implements the projection method described in Appendix 2 can accurately generate the projective transformation matrix used for the second correction and can more accurately maintain the shape of the projection image in the shape desired by the user.

3.3. Appendix 3

The projection method according to Appendix 2, further including: displaying, by controlling the projection apparatus, on the projection surface, four corner images corresponding one-to-one to the four corners of the display area; and changing a display mode of one corner image corresponding to the first corner among the four corner images when the selection of the one or more first feature points is completed at the first corner, in which the four corners of the first image correspond one-to-one to the four corner images.

Accordingly, the user can easily distinguish between a corner at which the selection of the first feature point is completed and a corner at which the selection of the first feature point is not completed.

3.4. Appendix 4

The projection method according to Appendix 2 or 3, further including: changing a display mode of the one instruction image in response to selection of the one first feature point.

Accordingly, the user can easily distinguish between an instruction image corresponding to a selected first feature point and an instruction image corresponding to an unselected first feature point.

3.5. Appendix 5

The projection method according to any one of Appendices 2 to 4, in which displaying the one instruction image among the plurality of instruction images in the manner distinguishable from the other instruction images on the projection surface includes displaying the one instruction image in a display mode that changes over time.

For example, the projector or the projection system that implements the projection method described in Appendix 5 repeatedly blinks one instruction image serving as a selection candidate of the user, thereby changing the display mode of the instruction image over time. Accordingly, the user can easily distinguish the one instruction image serving as the selection candidate from the other instruction images.

3.6. Appendix 6

The projection method according to any one of Appendices 2 to 4, in which displaying the one instruction image among the plurality of instruction images in the manner distinguishable from the other instruction images on the projection surface includes displaying the one instruction image in a display mode different from the pointer image.

Accordingly, the user can easily distinguish between the instruction image and the pointer image.

3.7. Appendix 7

A program including: causing a processing apparatus to control a projection apparatus to display a projection image having four corners inside a display area having four corners, the display area being an area on a projection surface, acquire a first captured image representing a result of imaging a range including the display area where the projection image is displayed, detect, by performing image processing on the first captured image, a plurality of first feature points corresponding one-to-one to each of four corners of a first image indicating the display area in the first captured image, control the projection apparatus to display a pointer image for adjusting a shape of the projection image, the pointer image being located at a corner of the projection image, perform a first correction of correcting the shape of the projection image by changing a position of the corner of the projection image based on a user operation for moving the pointer image, and perform, based on the plurality of first feature points, a second correction for maintaining a positional relationship between the four corners of the display area and the four corners of the projection image determined by the first correction.

That is, by performing the first correction based on the operation from the user, a projector or a projection system that operates according to the program described in Appendix 7 corrects the shape of the projection image to the shape desired by the user. The projector or the projection system that operates according to the program described in Appendix 7 maintains the position where the projection image is displayed and the shape of the projection image by performing the second correction. Accordingly, the projector or the projection system that operates according to the program described in Appendix 7 can maintain the shape of the projection image in the shape desired by the user. The first correction is performed based on the operation of the user. Therefore, the user can easily adjust the shape of the projection image without accurately adjusting a position, an orientation, an angle, and the like of the projector.

What is claimed is:

1. A projection method comprising:

displaying, by controlling a projector, a projection image having four corners inside a display area having four corners, the display area being an area on a projection surface;

acquiring a first captured image that is a captured image of a range including the display area where the projection image is displayed;

detecting, by performing image processing on the first captured image, a plurality of first feature points corresponding one-to-one to each of four corners of a first image indicating the display area in the first captured image;

displaying, by controlling the projector, a pointer image for adjusting a shape of the projection image, the pointer image being located at a corner of the projection image;

performing a first correction of correcting the shape of the projection image by changing a position of the corner of the projection image based on a user operation for moving the pointer image; and performing, based on the plurality of first feature points, a second correction for maintaining a positional relationship between the four corners of the display area and the four corners of the projection image determined by the first correction, wherein the four corners of the first image include a first corner, a second corner, a third corner, and a fourth corner, the plurality of first feature points include one or more first feature points corresponding to the first corner, one or more first feature points corresponding to the second corner, one or more first feature points corresponding to the third corner, and one or more first feature points corresponding to the fourth corner, and the projection method further comprises:

displaying, by controlling the projector, a plurality of instruction images corresponding one-to-one to the plurality of first feature points on the projection surface;

displaying, by controlling the projector, one instruction image among the plurality of instruction images in a manner distinguishable from the other instruction images on the projection surface;

setting, in response to a user operation of selecting the one instruction image among the plurality of instruction images displayed on the projection surface, one first feature point corresponding to the selected one instruction image as the first feature point for performing the second correction, wherein setting one first feature point for performing the second correction includes receiving a user operation of selecting four or more first feature points, wherein receiving the user operation of selecting four or more first feature points includes selecting one or more first feature points from the one or more first feature points corresponding to the first corner, selecting one or more first feature points from the one or more first feature points corresponding to the second corner, selecting one or more first feature points from the one or more first feature points corresponding to the third corner, and selecting one or more first feature points from the one or more first feature points corresponding to the fourth corner, to set the plurality of first feature points for performing the second correction; and performing the second correction includes acquiring a second captured image representing a result of imaging a range including the display area where the projection image subjected to the first correction is displayed, and detecting, by performing image processing on the second captured image, a plurality of second feature points, one or more of which corresponds to each of four corners of a second image indicating the display area in the second captured image, and the second correction is performed based on coordinates of the four or more first feature points and coordinates of the plurality of second feature points.

2. The projection method according to claim 1, further comprising:

displaying, by controlling the projector, four corner images corresponding one-to-one to the four corners of the display area on the projection surface; and changing a display mode of one corner image corresponding to the first corner among the four corner images when the selection of the one or more first feature points is completed at the first corner, wherein the four corners of the first image correspond one-to-one to the four corner images.

3. The projection method according to claim 1, further comprising:

changing a display mode of the one instruction image in response to selection of the one first feature point.

4. The projection method according to claim 1, wherein displaying the one instruction image among the plurality of instruction images in the manner distinguishable from the other instruction images on the projection surface includes displaying the one instruction image in a display mode that changes over time.

5. The projection method according to claim 1, wherein displaying the one instruction image among the plurality of instruction images in the manner distinguishable from the other instruction images on the projection surface includes displaying the one instruction image in a display mode different from the pointer image.

6. A non-transitory computer-readable storage medium storing a program, the program comprising:

causing one or more processors to control a projector to display a projection image having four corners inside a display area having four corners, the display area being an area on a projection surface, acquire a first captured image representing a result of imaging a range including the display area where the projection image is displayed, detect, by performing image processing on the first captured image, a plurality of first feature points corresponding one-to-one to each of four corners of a first image indicating the display area in the first captured image, control the projector to display a pointer image for adjusting a shape of the projection image, the pointer image being located at a corner of the projection image, perform a first correction of correcting the shape of the projection image by changing a position of the corner of the projection image based on a user operation for moving the pointer image, and perform, based on the plurality of first feature points, a second correction for maintaining a positional relationship between the four corners of the display area and the four corners of the projection image determined by the first correction, wherein the four corners of the first image include a first corner, a second corner, a third corner, and a fourth corner, the plurality of first feature points include one or more first feature points corresponding to the first corner, one or more first feature points corresponding to the second corner, one or more first feature points corresponding to the third corner, and one or more first feature points corresponding to the fourth corner, and the program further causes the one or more processors to:

display, by controlling the projector, a plurality of instruction images corresponding one-to-one to the plurality of first feature points on the projection surface;

display, by controlling the projector, one instruction image among the plurality of instruction images in a manner distinguishable from the other instruction images on the projection surface;

set, in response to a user operation of selecting the one instruction image among the plurality of instruction images displayed on the projection surface, one first feature point corresponding to the selected one instruction image as the first feature point for performing the second correction, wherein set one first feature point for performing the second correction includes receiving a user operation of selecting four or more first feature points, wherein receiving the user operation of selecting four or more first feature points includes selecting one or more first feature points from the one or more first feature points corresponding to the first corner, selecting one or more first feature points from the one or more first feature points corresponding to the second corner, selecting one or more first feature points from the one or more first feature points corresponding to the third corner, and selecting one or more first feature points from the one or more first feature points corresponding to the fourth corner, to set the plurality of first feature points for performing the second correction; and performing the second correction includes acquiring a second captured image representing a result of imaging a range including the display area where the projection image subjected to the first correction is displayed, and detecting, by performing image processing on the second captured image, a plurality of second feature points, one or more of which corresponds to each of four corners of a second image indicating the display area in the second captured image, and the second correction is performed based on coordinates of the four or more first feature points and coordinates of the plurality of second feature points.

7. The non-transitory computer-readable storage medium according to claim 6, wherein the program further causes the one or more processors to:

display, by controlling the projector, four corner images corresponding one-to-one to the four corners of the display area on the projection surface; and change a display mode of one corner image corresponding to the first corner among the four corner images when the selection of the one or more first feature points is completed at the first corner, wherein the four corners of the first image correspond one-to-one to the four corner images.

8. The non-transitory computer-readable storage medium according to claim 6, wherein the program further causes the one or more processors to:

change a display mode of the one instruction image in response to selection of the one first feature point.

9. The non-transitory computer-readable storage medium according to claim 6, wherein displaying the one instruction image among the plurality of instruction images in the manner distinguishable from the other instruction images on the projection surface includes displaying the one instruction image in a display mode that changes over time.

10. The non-transitory computer-readable storage medium according to claim 6, wherein displaying the one instruction image among the plurality of instruction images in the manner distinguishable from the other instruction images on the projection surface includes displaying the one instruction image in a display mode different from the pointer image.

* * * * *